United States Patent [19]
Uenoyama et al.

[11] Patent Number: 5,857,187
[45] Date of Patent: Jan. 5, 1999

[54] INFORMATION MANAGEMENT APPARATUS PROVIDING EFFICIENT MANAGEMENT OF MULTIMEDIA TITLES IN A CLIENT-SERVER NETWORK

[75] Inventors: Tsutomo Uenoyama, Tokyo; Toshiichi Ohno, Urawa; Masao Kato, Yokohama; Akira Inagaki, Tokyo, all of Japan

[73] Assignee: Matsushita Electric Industrial Co., Ltd., Osaka, Japan

[21] Appl. No.: 675,321

[22] Filed: Jul. 10, 1996

[30] Foreign Application Priority Data

Jul. 11, 1995 [JP] Japan .................................. 7-174661
May 16, 1996 [JP] Japan .................................. 8-121255

[51] Int. Cl.⁶ .................................................. G06F 17/30
[52] U.S. Cl. .............................. 707/8; 395/701; 395/500; 382/166
[58] Field of Search .................................. 395/701, 500, 395/759; 382/166; 380/20; 364/550; 707/8

[56] References Cited

U.S. PATENT DOCUMENTS

| | | | |
|---|---|---|---|
| 4,964,039 | 10/1990 | Izawa et al. | 395/500 |
| 5,027,400 | 6/1991 | Baji et al. | 380/20 |
| 5,408,659 | 4/1995 | Cavendish et al. | 707/8 |
| 5,528,491 | 6/1996 | Kuno et al. | 395/759 |
| 5,553,289 | 9/1996 | Johnson et al. | 395/701 |
| 5,642,511 | 6/1997 | Chow et al. | 395/701 |
| 5,652,714 | 7/1997 | Peterson et al. | 364/550 |
| 5,652,868 | 7/1997 | Williams | 395/500 |
| 5,659,631 | 8/1997 | Gormish et al. | 382/166 |
| 5,680,619 | 10/1997 | Gudmundson et al. | 395/701 |
| 5,706,427 | 1/1998 | Tabuki et al. | 395/187.01 |

FOREIGN PATENT DOCUMENTS 6-259472  9/1994  Japan .......................... 15/40

OTHER PUBLICATIONS

Computer Communications, vol. 13, No. 4, May 1, 1990, pp. 217–231, XP000126283, Berra P B et al: "Architecture For Distributed Multimedia Database Systems".

Broadcast Sessions, Montreux, Jun. 10–15, 1993, No. Symp. 1993, Jun. 10, 1993, Postes; Telephones Et Telegraphes Suisses, pp. 571–597, XP000385316, Lamaa F: "Open Media Framework Tm Interchange".

Communications Of The Association For Computing Machinery, vol. 34, No. 11, Nov. 1, 1991, pp. 67–83, XP000271579, Newcomb S R et al: "The Hytime " Hypermedia/Time–Based Document Structuring Language.

Scaling New Heights In Technical Communication, Banff, Sep. 28–Oct. 1, 1994, Sep. 28, 1994, Institute Of Electrical And Electronics Engineers, pp. 192–197, XP000510688, Lau T: "Building a Hypermedia Information System On The Internet".

"Ietf Structure and Internet Standards Process" by Steve Coya; Sep. 9, 1994.

Primary Examiner—Thomas G. Black
Assistant Examiner—Charles L. Rones
Attorney, Agent, or Firm—Lowe Hauptman Gopstein Gilman & Berner

[57] ABSTRACT

An information management apparatus, for registering data of multimedia titles in a client/server system and supplying the data to users of client terminals, stores title management information for each registered title, including title identification and title storage location information, together with key word information which can be directly utilized to implement search techniques based on HTML files, relational database, etc. The apparatus enables client terminals having respectively different operating systems to specify storage location information for respective hypermedia titles created using the terminals, with problems of incompatibility of forms of storage location syntax between the various client terminals being overcome, enabling any client terminal to be used in accessing data of any registered title.

10 Claims, 36 Drawing Sheets

FIG. 4

```
TITLE MANAGEMENT INFORMATION
 :TITLE INFORMATION
  TITLE MANAGEMENT INFORMATION [LINE FEED] TITLE INFORMATION

TITLE INFORMATION
 :TITLE NUMBER '{'[LINE FEED]
  [BLANK] TITLE STORAGE LOCATION INFORMATION [LINE FEED]
  [BLANK] TITLE NAME [LINE FEED]
  [BLANK] KEYWORD INFORMATION [LINE FEED]
  '}' [LINE FEED]

KEYWORD INFORMATION
 :ATTRIBUTE ' (' ATTRIBUTE VALUE ')'
  KEYWORD INFORMATION [LINE FEED]
  [BLANK] ATTRIBUTE ' (' ATTRIBUTE VALUE ')'

ATTRIBUTE
 :[CHARACTER STRING EXPRESSNG TYPE OF KEYWORD INFORMATION]

ATTRIBUTE VALUE
 :[CHARACTER STRING EXPRESSNG KEYWORD INFORMATION]

TITLE NUMBER
 :[NUMBER WHICH UNIQUELY DEFINES THE TITLE]

TITLE NAME
 :[CHARACTER STRING EXPRESSING NAME, ASSIGNED AT TIME OF CREATING TITLE]

TITLE STORAGE LOCATION
 :[CHARACTER STRING EXPRESSING STORAGE LOCATION OF SCENARIO FILE]
```

FIG. 5

```
0005{
 server://title/0005/title.vsc
 title5
 (95/07/01)
 (Jack Jones)
 (Forsale [Tickets [Ballet]])
 }
```

FIG. 12

Title management information file
(before registering new title)

```
0005{
  server://title/ooo5/title.vsc
  title5
  authorname (John Jones)
  noticeboard (Forsale[Tickets[Rock]])
}
```

Title management information file
(after registering new title)

```
0005{
  server://title/ooo5/title.vsc
  title5
  authorname (John Jones)
  noticeboard (Forsale[Tickets[Rock]])
}
0006{
  server://title/0006/title.vsc
  title6
  authorname (Jane Smith)
  noticeboard (Forsale[Tickets[Ballet]])
}
```

Intermediate file

```
add{
  [Titles]
    ID,0006
    file,server://title/0006/title.vsc
  [Keywords]
    ID,0006
    item,authorname
    Value, John Jones
    ID,0006
    Item,noticeboard
    Value,Forsale[Tickets[Ballet]]
}
```

SQL

```
INSERT INTO Titles(ID,file)
  VALUES('0006','server://Title/0006/title.vsc');
INSERT INTO Keywords(ID,Item,Value)
  VALUES('0006','authorname','John Jones');
INSERT INTO Keywords(ID,Item,Value)
  VALUES('0006','noticeboard',
  'Forsale[Tickets[Ballet]]');
```

FIG. 14A

```
Title(Title name)
Material (subject matter number, subject matter file name and storage location,
         subject matter file size, subject matter presentation position)
      ...
Event(event number, event type, time point)
```

FIG. 14B (B1)
```
Title name
subject matter number  subject matter file storage location
```

(B2)
```
Title name
subject matter number, subject matter file name  subject matter file size
                                                 subject matter presentation position
      ...
event number  subject matter number  event type  time point
```

```
TITLE:
Title name
MATERIAL:
subject matter number, subject matter file name  subject matter file size
                                                 subject matter presentation position
      ...
EVENT:
event number  subject matter number  event type  time point
```

FIG. 16A

```
Title(Title01)
Material(0001,H:¥material¥video¥mpeg¥title1.mpg) ← A
Material(0002,G:¥material¥image¥bmp¥image1.bmp)
Material(0003,G:¥material¥image¥bmp¥image2.bmp)
Material(0004,G:¥material¥image¥bmp¥image3.bmp)
Material(0005,K:¥material¥text¥plain¥sjis¥text1.txt)
   :
Event(0001,0001,play,0000)
Event(0002,0002,show(01,0,0),0000)
Event(0003,0003,show(01,100,200),0010)
   :
```

Scenario example 1
(Client terminal 1)

FIG. 16B

```
Title(Title01)
Material(0001,server1:/home/data/material/video/mpeg/title1.mpg)
Material(0002,/home/data/material/image/bmp/image1.bmp) ← B
Material(0003,/home/data/material/image/bmp/image2.bmp)
Material(0004,/home/data/material/image/bmp/image3.bmp)
Material(0005,server2:/material/text/plain/sjis/text1.txt)
   :
Event(0001,0001,play,0000)
Event(0002,0002,show(01,0,0),0000)
Event(0003,0003,show(01,100,200),0010)
   :
```

Scenario example 2
(Server computer)

FIG. 16C

```
(C1)
Title01
0001 ¥¥server1¥material¥video¥mpeg¥title1.mpg
0002 ¥¥server0¥material¥image¥bmp¥image1.bmp  ← C
0003 ¥¥server0¥material¥image¥bmp¥image2.bmp
0004 ¥¥server0¥material¥image¥bmp¥image3.bmp
0005 ¥¥server2¥material¥text¥plain¥sjis¥text1.txt
   :
```
Header file

```
(C2)
TITLE:
Title01
MATERIAL
0001 title1.mpg
0002 image1.bmp  ← C'
0003 image2.bmp
0004 image3.bmp
0005 text1.txt
   :
Event(0001,0001,play,0000)
Event(0002,0002,show(01,0,0),0000)
Event(0003,0003,show(01,100,200),0010)
   :
```
Scenario file Scenario example 3
(Client terminal 2)

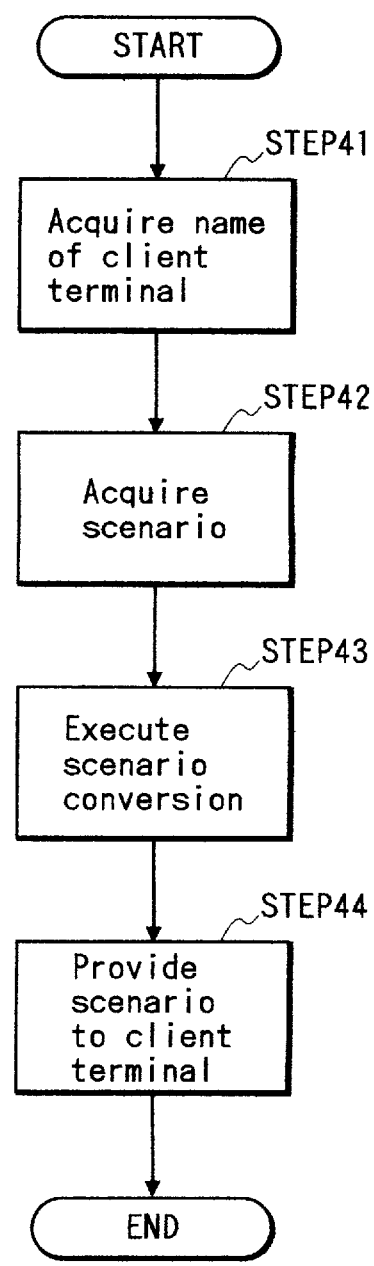

FIG. 23A

```
[(client terminal name)]
  processing_file: (script conversion procedure name)
  slash: (directory delimiter character)
  connect: (client terminal path) = (server path)
    ...       ...
[(client terminal name)]
    ...       ...
```

FIG. 23B

```
[client01]
  proc_file: "0001.prc"
  slash: "¥"
  connect: "G:" = "/home/data"
  connect: "H:" = "server1:/home/data"
  connect: "K:" = "server2:/home/data"

[client02]
  proc_file: "0002.prc"
  slash: "¥"
  connect: "¥¥server0" = "/home/data"
  connect: "¥¥server1" = "server1:/home/data"
  connect: "¥¥server2" = "server2:/home/data"

[client03]                                    C
  slash: "¥"
  connect: "G:" = "/home/data"
  connect: "H:" = "server1:/home/data"
  connect: "K:" = "server2:/home/data"

[client04]
    ...
```

FIG. 26

```
<machine1>://video/mpeg /travel_1.mpg    <server>://video/mpeg /travel_1.mpg
<machine2>://image/bmp/travel_a.bmp      <server>: //image/bmp/travel_a.bmp
<machine2>://image/bmp/travel_b.bmp      <server>: //image/bmp/travel_b.bmp
<machine2>://image/bmp/travel_c.bmp      <server>: //image/bmp/ travel_c.bmp
<machine2>://text/sjis/travel_1.txt      <server>: //text/sjis/travel_1.txt
<machine2>://text/sjis/travel_2.txt      <server>: //text/sjis/travel_2.txt
<machine2>://text/sjis/travel_3.txt      <server>: //text/sjis/travel_3.txt
```

INFORMATION MANAGEMENT APPARATUS PROVIDING EFFICIENT MANAGEMENT OF MULTIMEDIA TITLES IN A CLIENT-SERVER NETWORK

BACKGROUND OF THE INVENTION

1. Field of the Invention

The present invention relates to an information management apparatus which forms part of a client-server data communication network, and which enables a plurality of multimedia titles to be shared by the client terminals and server computers of such a system. In particular the present invention relates to an information management apparatus whereby various types of monomedia data constituting the subject matter data of a multimedia title are stored in respectively different data storage devices.

The term "multimedia title" as used herein signifies a multimedia object which consists of a plurality of sets of subject matter data of respective monomedia objects (i.e. respective sets of data expressing video clips, audio clips, still pictures, text items, etc.) in conjunction with scenario data. The scenario data specify the storage locations of respective data files containing the subject matter data and also specify how the subject matter data are to be presented during playing of the multimedia title, i.e. times of starting and ending presentation of respective items, display screen window sizes and positions for respective items, etc. The term "management" of multimedia titles as used herein basically signifies such processing as registering new multimedia titles in response to requests and data supplied from client terminals, supplying specific data contents of a multimedia title or information relating to the title, in response to a request from a client terminal, deletion of data relating to a multimedia title from storage, when necessary, etc.

2. Description of the Prior Art

In the following, it will be assumed that a client-server network system has a specific server computer which functions as an information management servers for managing data of multimedia titles, and that each of the client terminals communicate mutually independently with that information management server. In practice, the client terminals may also be able to access other server computer systems via the network.

In a prior art client/server network, a user of a client terminal, which in general will be a usual type of personal computer having limited data storage resources, can create a new multimedia title by using the high-capacity data storage devices of the server computer (which will typically be a work station) to store the data of the multimedia title, i.e. high-capacity data storage devices such as hard disk units, which are shared by the server computer and all of the client terminals of the network. The process of creating a multimedia title is illustrated in the conceptual diagram of FIG. 2. The first stage is inputting of subject matter data (which can be used as a basis for creating the multimedia title, i.e. basic subject matter data) by the user, using a client terminal. As the second stage, these basic subject matter data are transferred to the server computer, to be stored in data storage devices of the server computer, i.e. in data storage which is shared by the server computer and each of the client terminals of the network.

In the third stage, the user of the client terminal selects desired parts of the stored basic subject matter data, i.e. those parts which are to be actually used in the multimedia title, and generates the part of the scenario data which constitutes the "story" of the multimedia title, i.e. the scenario. These data specify, for respective time points during playing of the multimedia title, presentation of respective monomedia objects of the multimedia title, i.e. specify those points at which respective sets of subject matter data must be obtained from storage and used to generate a video picture, still picture, audible item, etc., during a specific interval, and also specify how such items are to be presented (i.e. display window position, size, etc.), as well as respective time points at which presentation of the items is to be ended. In addition, a list of the selected subject matter data (i.e. specified as respective data files) and storage location information for the subject matter data, are also generated. That third step will be referred to in the following as "authoring".

In the fourth step, which constitutes the title registration processing, in the prior art, the subject matter data file information and the scenario information generated by the authoring stage are supplied to the server computer, which then generates a scenario file. This includes respective storage location information for the subject matter data files, and the "story" information, i.e. sequence of events, linked to the subject matter data files.

The purpose of the title registration processing is to enable the multimedia title to be managed as an integrated set of data, or more specifically, as an integrated set of data files. One aspect of this is that all of the multimedia title data (subject matter data files and scenario file) are stored in the same data storage installation, i.e. at the server computer which is responsible for multimedia title management. Another aspect is that these multimedia title data must be stored such as to be directly accessible by the server computer and also (at least with respect to read-out operations) by all of the client terminals of the network. One reason for this is that, when the server computer receives a request from a client terminal for the data of a specific multimedia title, the server computer must then read out and transfer the scenario file of that multimedia title to the requesting client terminal. That client terminal must be able to then directly access and read out all of the subject matter data files whose names and storage location information are specified in the scenario file.

In addition, to enable such management of the multimedia title, it must be possible for the "story" part of the scenario to be correctly linked, in the scenario file, to the actual storage locations of the respective subject matter data files, as a result of the title registration processing.

However with such a prior art type of information management apparatus used for creating and managing multimedia titles, the problem may arise that the computer which constitutes a client terminal may use a different format for expressing data storage locations from that used by the computer which constitutes the server, since these computers may utilize different types of basic operating software, i.e. different operating systems.. This is conceptually illustrated in FIG. 3, in which a file having the name "data.mpeg" (such as a file containing compressed video data) is held in a storage device of a server computer, which is used in common by the server computer and one or more client terminals. In this example, the server computer expresses the storage location information for the file "data.mpeg" as:

//server/data/video/data.mpeg

This is an absolute path name, i.e. leading from the root of the file directory structure of the server computer.

However the operating system of the client terminal (i.e. internally, with respect to handling file access requests from a user and presenting file storage location information to the user) might express the contents of the directory "/data" of the server as if these were stored on a (virtual) local disk drive of the client terminal, identified by a "drive letter". In that case the storage location designation employed by the user of the client terminal (i.e. in communicating with the client terminal), for that same file, might be:

F:/VIDEO/MPEG/DATA.MPG

This represents a relative path name, leading from the "/data" directory of the server file system. Such storage location information cannot be used directly by the server computer to access files.

In addition, client terminals may use various different types of path name delimiter. For example, the above example might be expressed within the file system of the client terminal as:

F:¥VIDEO¥MPEG¥DATA.MPG

In the following, all of such differences in modes of expressing the same data file storage location information by different computer systems will be referred to collectively as differences in storage location information syntax.

In the case of creating and registering a multimedia title, this can lead to a serious problem, since the server computer which is to manage the multimedia titles must obtain the storage information for the subject matter data from a scenario file prepared by the user, which is a text file. That is to say, if a user of the client terminal shown in FIG. 3 prepares the contents of the scenario for a new multimedia title as described above, i.e. consisting of the "story" data for a multimedia title and information specifying the storage locations of the subject matter data of that multimedia title expressed in the syntax used within the operating environment of that particular client terminal, and sends to the server computer a scenario file which includes such storage location information, then the server computer will not be able to correctly use that information. For that reason, it has been necessary in the prior art to use a temporary data storage device (i.e. controlled by a local computer), which is connected via the nework to the server computer and each of the client terminals, and can be directly accessed by the server computer. When a new multimedia title is being created, the client terminal user selects required subject matter data files and causes (i.e. using the particular method of storage location information designation which is employed with that client terminal) the selected files to be read out of the aforementioned common data storage device of the server computer, and transferred via the network to be stored as respective files in the temporary data storage device. When a subject matter data file has been stored in that device, it can be accessed by the server computer, and its contents transferred via the network to be stored in the common data storage device. When all of the subject matter data files have been transferred in that way to the server computer, the title registration processing can begin.

That is to say, in this case, since the temporary data storage device and the computer which controls operation of the temporary data storage device are fixed, the path to any specific storage location within that temporary data storage device is fixed. Hence, it becomes possible for the server computer to access a file which is held in the temporary data storage device by using only the file name, i.e. without it being necessary to specify a computer name or directory name.

However if the subject matter data include very large amounts of data, such as extensive video data files, then a considerable time is required to transfer data between storage devices via the network, so that an excessive amount of processing time is required to complete the registration processing for a multimedia title.

There is therefore a requirement for an information management apparatus which would enable a server computer to directly access subject matter data files whose storage location information have been generated by a client terminal, for thereby increasing the speed and efficiency of title registration processing and of the management of multimedia titles by the server computer.

Another problem which arises is that, with such a client-server system used as an information management apparatus for registering and managing multimedia titles, the various client terminals may use respectively different application programs for preparing the scenarios, so that the structures of the resultant scenarios will not be uniform, between the various client terminals. For example, some client terminals may use a single-file structure, others may use a dual-file structure, i.e. a header file which contains only subject matter data file names and storage location information, together with a scenario file which contains the actual "story" of the multimedia title, i.e. which relates successive events of the title to specific subject matter data files, etc.

Also, with a multimedia title, the respective storage locations of the various sets of monomedia data (i.e. data files expressing video clips, audio clips, text items, etc) which constitute the contents of the title are listed only within the scenario file of that multimedia title, and so are not directly accessible. That is to say, if a user of a client terminal wishes to access a subject matter data file of a multimedia title which is stored in a server computer, then it is necessary for that user to first execute operations to acquire the scenario file of that multimedia title from the server computer, then examine the contents of the scenario file to find the storage location of the desired subject matter data file. However in a client-server system, the various client terminals may have different types of operating system from one another. As a result, when the client terminals are used to create multimedia titles, the syntax used in the resultant scenarios, e.g. to express file storage locations (i.e. path names) may be respectively different between the various client terminals, as well as between the client terminals and the server.

In a client-server nework system in which it is desired to enhance productivity by making as many resources and data available to be shared by all of the users of the client terminals, it would be desirable for not only complete multimedia titles to be freely available to all of the client terminals, but also for the respective subject matter data of these multimedia titles to be similarly freely accessible from each client terminal. In that case, for example, it becomes possible for users to extract desired subject matter data files from a pre-existing multimedia title, to insert some or all of the contents into a multimedia title which is being newly created, thereby increasing productivity. However because of the problems of difficulty of direct access to subject matter data files and differences between command formats of client terminals which employ computers having various different types of operating system, etc, it has not been possible to provide such free access to the multimedia title subject matter data, in the prior art.

Furthermore in recent years, the scope of computer networks has extended to a worldwide scale, as is exemplified by the Internet. In such networks, the HTML (Hypertext Markup Language) is generally used to express data in a form which can be easily and rapidly searched for and located, e.g. as items contained in respective menu (notice board) pages which are successively linked. The HTML standards are defined in detail in an Internet Draft of the IETF (Hypertext Markup Language—2.0) Mar. 3, 1995, MIT/W3C, so that detailed description will be omitted.

However in the prior art, it has been difficult to use a standard technique for rapid look-up of data, such as HTML, to access stored multimedia titles. This is basically due to the tact that in order to access a multimedia title which is stored at a server computer, it is necessary to supply to the server computer (e.g. from a client terminal) commands which are in the specific format which will be recognized by the server computer.

SUMMARY OF THE INVENTION

It is an objective of the present invention to overcome the various problems of the prior art set out hereinabove. In particular, it is an objective to provide an information management apparatus for managing multimedia titles in a client-server network, whereby after a multimedia title has been created by a user of a client terminal (i.e. as a scenario file in combination with a set of subject matter data files) and has been registered by the apparatus, it becomes possible for a user of any other client terminal of the network to acquire any of the files constituting that multimedia title, irrespective of differences in type of operating system between the client terminals and a server computer which executes the registration function, or differences between the operating systems of the various client terminals.

More specifically, according to a first aspect, the invention provides and information management apparatus comprising an information management server and a plurality of client terminals respectively connected for data interchange with the information management server, the information management server comprising:

data storage means including file storage means for storing data files including respective scenario files for a plurality of multimedia titles, and title management information storage means for storing title management information in the form of respective title management information entries for each of the multimedia titles, each of the title management information entries containing at least information which identifies a corresponding multimedia title;

script processing means for executing script conversion of data prior to storage in the file storage means and script conversion of data which are read out of the file storage means;

title processing means including title registration means for executing registration processing of a multimedia title in response to a request from one of the client terminals, in conjunction with a scenario file for the multimedia title, the scenario file including respective names and storage location information for subject matter data files constituting the multimedia title, the registration processing including operations for supplying the scenario file to the script processing means, to be subjected to script conversion from a form which is compatible with the requesting client terminal, and for storing a resultant scenario file in the file storage means, and operations for generating and storing in the title management information storage means a title management information entry relating to the multimedia title, and title acquisition and output means responsive to a request from one of the client terminals to acquire one of the multimedia titles for obtaining a scenario file for the multimedia title from the file storage means, supplying the scenario file to the script processing means, to be subjected to script conversion into a form which is compatible with the requesting client terminal, and supplying a resultant scenario file to the requesting client terminal;

the script processing means comprising conversion procedure data storage means having stored therein data expressing a plurality of respectively different script conversion procedures, conversion procedure selection means controllable for selecting a specified one of the script conversion procedures stored in the conversion procedure data storage means, and script conversion means for determining an appropriate one of the script conversion procedures in accordance with an identity of a client terminal which is requesting execution of title registration processing or title acquisition processing, for controlling the conversion procedure selection means to acquire the appropriate script conversion procedure from the conversion procedure data storage means, and for executing script conversion by utilizing the script conversion procedure.

With such an information management apparatus, the script conversion procedures can be procedures for conversion of the syntax of the storage location information of a scenario file from a form which is compatible with a client terminal to a form which is compatible with the information management server, and procedures for conversion of syntax of the storage location information of a scenario file from a form which is compatible with the information management server to a form which is compatible with a client terminal.

In addition, the script conversion procedures may comprise at least one script conversion procedure for conversion of syntax of the storage location information of a scenario file from a form which is compatible with a client terminal to a form which is compatible with the information management server and conversion of the scenario file from a structure which is compatible with the client terminal to a structure which is compatible with the information management server, and at least one script conversion procedure for conversion of syntax of the storage location information of a scenario file from the form which is compatible with the information management server to the form which is compatible with the client terminal and for conversion of the scenario file from the structure which is compatible with the information management server to the structure which is compatible with the client terminal.

According to a second aspect, the invention provides an information management apparatus comprising an information management server and a plurality of client terminals respectively connected for data interchange with the information management server, the information management server comprising:

data storage means including file storage means for storing a plurality of sets of data files respectively expressing a plurality of multimedia titles, each of sets formed of a scenario file and a plurality of subject matter data files, and title management information storage means for storing title management information in the form of respective title management information entries for each of the multimedia titles, each of the title management information entries containing at least information which identifies a corresponding multimedia title;

script processing means for executing script conversion of data prior to storage in the file storage means and script conversion of data which are read out of the file storage means;

title processing means including title registration means for executing registration processing of a multimedia title in response to a request from one of the client terminals, received in conjunction with a scenario file for the multimedia title, and for and storing title management information relating to the multimedia title in the title management information storage means, the scenario file including respective names and storage location information for subject matter data files constituting the multimedia title, subject matter management means for receiving from the title registration means the storage location information contained in the scenario file received from the requesting client terminal, for supplying the storage location information to the script processing means for conversion of the storage location information to corresponding converted storage location information which is in a form compatible with the information management server, for then using the converted storage location information to acquire each of the subject matter data files of the multimedia title for which registration is requested, and for storing the subject matter data files in the file storage means at specific locations, for inserting into the received scenario file storage location information expressing the specific locations, to thereby obtain a converted scenario file, and storing the converted scenario file in the file storage means, and title acquisition and output means responsive to a request from ore of the client terminals to acquire one of the multimedia titles for obtaining a scenario file corresponding to the multimedia title from the file storage means, supplying the scenario file to the script processing means, to be subjected to script conversion for converting the storage location information of the scenario file into a form which is compatible with the requesting client terminal, and supplying a resultant scenario file to the requesting client terminal;

the script processing means comprising conversion procedure data storage means having stored therein data expressing a plurality of respectively different script conversion procedures, conversion procedure selection means controllable for selecting a specified one of the script conversion procedures stored in the conversion procedure data storage means, and script conversion means for determining an appropriate one of the script conversion procedures in accordance with an identity of a client terminal which is requesting execution of title registration processing or title acquisition processing, for controlling the conversion procedure selection means to acquire the appropriate script conversion procedure from the conversion procedure data storage means, and for executing script conversion by utilizing the script conversion procedure.

At least a part of the title management information entries for the multimedia titles may contain keyword information, i.e. information representing a plurality of groups of sequentially linked sets of data items arranged in a hierarchy of sets, for use in search processing, and the information management server may further comprise HTML (Hypertext Markup Language) data output means which responds to a request from one of the client terminals for HTML data by reading out the title management information from the title management information storage means, converting the keyword information of the title management information into a corresponding set of linked HTML files, and supplying the HTML files to the requesting client terminal.

According to a third aspect, the invention provides an information management apparatus comprising an information management server, at least one client terminal, and common data storage means connected for mutual data communication, the common data storage means comprising subject matter data storage means, temporary title data storage means and title data storage means, and the subject matter data storage means comprising a plurality of subject matter data storage devices which are dedicated to storage of respectively different types of monomedia data, the client terminal comprising data input means operable by a user for inputting data to be used in creating a multimedia title, the input data comprising a plurality of respectively different types of monomedia data, subject matter preparation means operable by the user for arbitrarily modifying the input data to form respective sets of subject matter data for the multimedia title, the sets comprising a plurality of sets of the respectively different types of monomedia data, and for storing the sets as respective subject matter data files in respectively corresponding ones of the plurality of subject matter data storage means, authoring means operable by the user for arbitrarily selecting respective ones of the stored subject matter data files and for generating scenario data which specify a succession of events constituting the multimedia title and relate the events to specific ones of the selected subject matter data files, and for storing the scenario data as a scenario file in the temporary data storage means, scenario analysis means for obtaining the scenario file from the temporary title data storage means and analyzing the scenario file to obtain respective file names of the selected subject matter data files, memory means having stored therein a predetermined subject matter data storage device list, the list specifying respective storage device information for the selected subject matter data files with respect to the subject matter data data storage means, the storage device information being expressed in a form which is compatible with the syntax for storage location information that is used by the information management server, subject matter list generating means operating on the subject matter data storage device list and the file names of the selected subject matter data files to generate a subject matter list, the subject matter list expressing respective storage location information for each of the selected subject matter data files with respect to the subject matter data storage means, and for storing the subject matter list as a file in the temporary title data storage means, client terminal control means for overall control of the input means, subject matter preparation means, authoring means, scenario analysis means and subject matter list generating means, and responsive to storing of the subject matter list for sending data expressing a title registration request to the information management server, the title registration request including information identifying the subject matter list file;

the information management server comprising title registration means for reading out the scenario file from the temporary title data storage means, reading out the subject matter list from the temporary title data storage means and utilizing storage location information of the subject matter list to read out the selected subject matter data files from the subject matter data storage means, and storing the scenario file and selected subject matter data files in the title data storage means, and server control means for receiving the title registration request and controlling the title registration means in accordance with contents of the title registration request.

According to a fourth aspect, the invention provides an information management apparatus comprising an information management server, at least one client terminal, and common data storage means, which are connected for mutual data communication, the common data storage means comprising subject matter data storage means, temporary title data storage means and title data storage means, the subject matter data storage means comprising a plurality of subject matter data storage devices which are dedicated to storage of respectively different types of monomedia data, the client terminal comprising data input means operable by a user for inputting data to be used in creating a multimedia title, the input data comprising a plurality of respectively different types of monomedia data, subject matter preparation means operable by the user for arbitrarily modifying the input data to form respective sets of subject matter data for the multimedia title, the sets comprising a plurality of sets of the respectively different types of monomedia data, and for storing the sets as respective subject matter data files in respectively corresponding ones of the plurality of subject matter data storage devices, authoring means operable by the user for arbitrarily selecting respective ones of the stored subject matter data files and for generating scenario data which specify a succession of events constituting the multimedia title and relate the events to specific ones of the selected subject matter data files, and for storing the scenario data as a scenario file in the temporary title data storage means, client terminal control means for overall control of the input means, subject matter preparation means, authoring means, scenario analysis means and subject matter list generating means, and responsive to the storing of the subject matter list for sending data expressing a title registration request to the information management server, the title registration request including information identifying the subject matter list file;

the information management server comprising scenario analysis means for obtaining the scenario file from the temporary title data storage means and analyzing the scenario file to obtain respective file names of the selected subject matter data files, memory means having stored therein a predetermined subject matter data storage device list, the list specifying respective storage device information for the selected subject matter data files with respect to the subject matter data data storage means, the storage device information being expressed in a form which is compatible with the storage location syntax employed by the information management server, subject matter list generating means operating on the subject matter data storage device list and the file names of the selected subject matter data files to generate a subject matter list, the subject matter list expressing respective storage location information for each of the selected subject matter data files with respect to the subject matter data storage means, and for storing the subject matter list as a file in the temporary title data storage means, title registration means for reading out the scenario file from the temporary title data storage means, reading out the subject matter list from the temporary title data storage means and utilizing storage location information of the subject matter list to read out the selected subject matter data files from the subject matter data storage means, and storing the scenario file and selected subject matter data files in the title data storage means, and server control means for receiving the title registration request and controlling the title registration means in accordance with contents of the title registration request.

With such an apparatus, the common data storage means may further comprise title management information storage means and the information management server further comprises title management information generating means controlled by the server control means for generating title management information and storing the title management information as a file in the title management information storage means, with the title management information generating means functioning, when the selected subject matter data files and scenario file of a new multimedia title are stored in the title data storage means, to update the title management information file by adding thereto a title management information entry relating to the new multimedia title, with each title management information entry specifying at least storage location information for the multimedia title with respect to the title data storage means, and information for identifying the multimedia title.

In that case, the information management server may further comprise external database interface means coupled to transfer data between the title management information generating means and the external relational database, with the title management information generating means further comprising means controlled by the title registration means and the server control means for detecting any changes made in the title management information file which is stored in the title management information storage means, for generating data indicative of the changes in SQL (Standard Query Language) form, and supplying the data via the external database interface means to the external relational database, to be used to update portions of the external relational database which relate to the title management information.

BRIEF DESCRIPTION OF THE DRAWINGS

FIG. 4 shows an example of the format of a title management information file, used with the first embodiment;

FIG. 5 shows a specific example of a title management information entry corresponding to a hypermedia title;

FIG. 12 is a diagram for illustrating a process of generating SQL data for updating the external relational database in accordance with changes in the contents of the title management information file, with the third embodiment;

FIGS. 14A, 14B(B1–B2) show two different examples of structures of a scenario file;

FIGS. 16A, 16B and 16C show examples of scenarios expressed using different types of data storage location syntax and file structure;

FIG. 21 is a flow diagram showing the processing executed for acquisition of a hypermedia title by a client terminal from the information management server, with the fourth embodiment;

FIG. 22A is a flow diagram of a script conversion procedure which is executed in the title acquisition processing of FIG. 21, for the case in which a single-file type of scenario file is utilized by a client terminal which requests acquisition of a hypermedia title, while

FIGS. 23A, 23B respectively show an example of a format for the connection information, and a specific example of part of the connection information, used with the fourth embodiment;

FIG. 26 shows an example of a subject matter list, used with the fifth embodiment;

DESCRIPTION OF PREFERRED EMBODIMENTS

Figure 1:
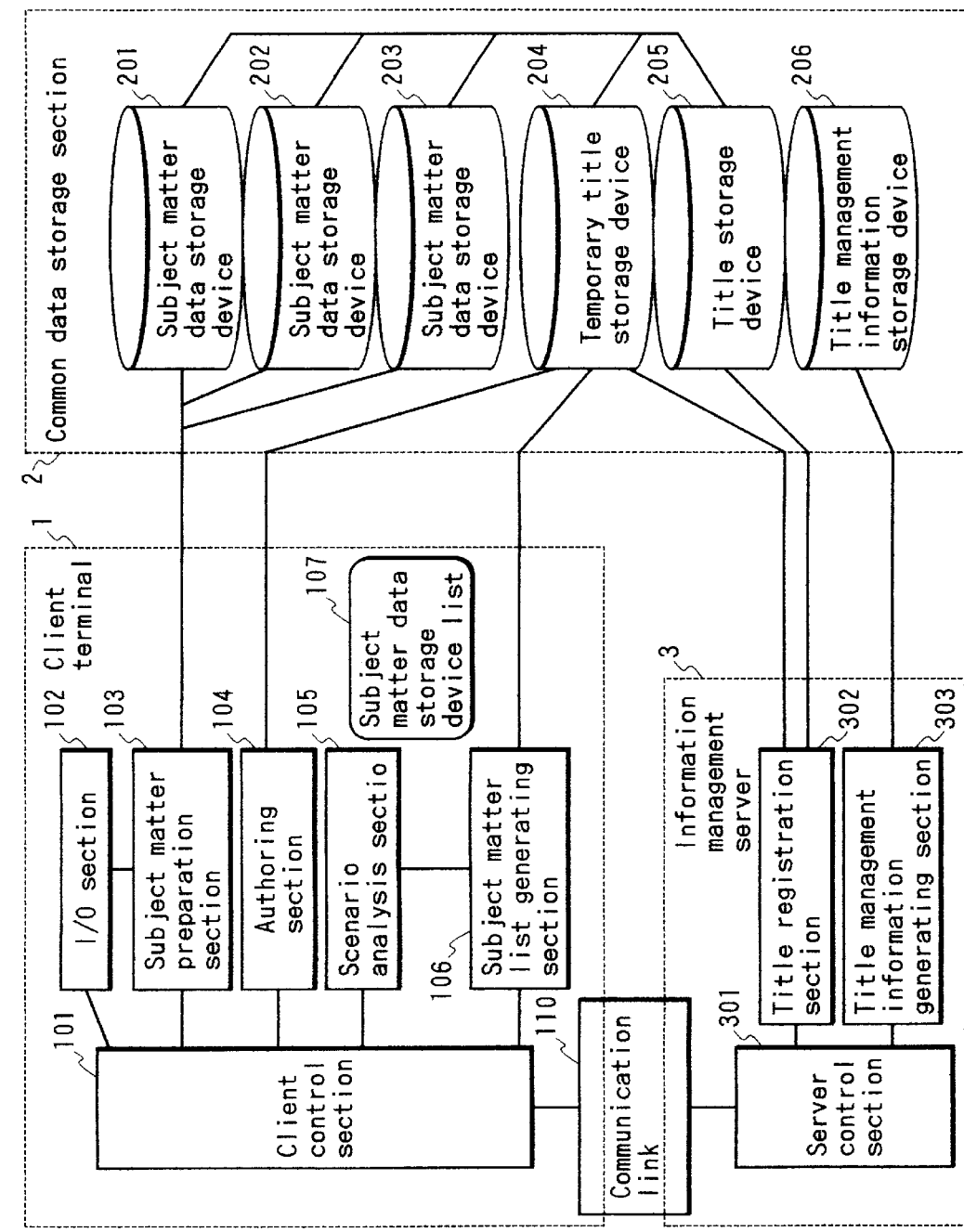
FIG. 1 is a general system block diagram of a first embodiment of an information management apparatus according to the present invention, in which each of respective client terminals stores a subject matter data storage device list.
Figure 2:
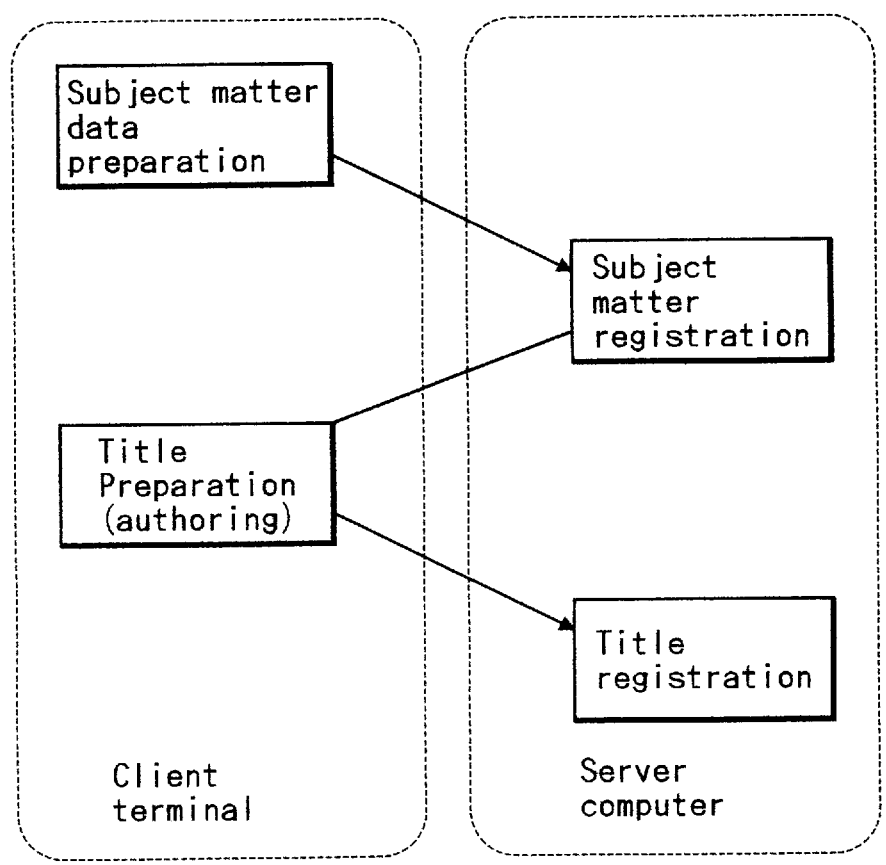
FIG. 2 is a diagram for illustrating the basic operation of hypermedia title registration, with the first embodiment.

FIG. 1 is a system block diagram of a first embodiment of an information management apparatus according to the present invention, for management of multimedia titles. It will be assumed that the multimedia titles are hypermedia titles, i.e. each multimedia title includes a specific finite-time monomedia data object such as a video object or audio object which is played continuously from start to end of playing the multimedia title and which is used as a timing reference (e.g. by counting successive video frames) for events which are specified in the aforementioned "story" data of the scenario.

The apparatus of FIG. 1 can be broadly divided into a client terminal 1, a common data storage section 2 and an information management server computer 3. The apparatus shown in FIG. 1 may be connected to other server computer systems via a data communication network, however the information management server computer 3 (whose functions may be implemented as a part of the overall operation of a server computer installation) executes functions which are specific to the present invention. The client terminal, common data storage section 2 and the information management server computer 3 (referred to in the following simply as server computer 3, for brevity of description) are mutually connected via a data communication network. It may be possible to implement a plurality of client terminals such as client terminal 1 (i.e. for respectively independent use by a plurality of users), each having the functions described for the client terminal 1, by a single physical client terminal (computer). The client terminal can be operated by a user to assemble the data contents of a new hypermedia title, and to issue a request to the server computer 3 for registering that new hypermedia title, or can be used to issue a request to the server computer 3 to obtain the data of a hypermedia title which is already registered. In that case, the client terminal section will first receive the scenario file of that hypermedia title, and can then access the subject matter data files whose storage location information is contained in the scenario file.

The client terminal 1 is made up of a client control section 101, an I/O section 102, a subject matter preparation section 103, an authoring section 104, a scenario analysis section 105, a subject matter list generating section 106 and a memory having stored therein a subject matter data storage device list 107. The I/O section 102 is operated by a user to input operating commands and data, and can consist of a combination of data input devices such as a keyboard, mouse, video player, etc., together with a video display unit.

When a new hypermedia title is being created, firstly, the basic subject matter data are input by the user, via the I/O section 102, and any necessary modifications or corrections to these data are performed, using the I/O section 102 and subject matter preparation section 103. The resultant subject matter data are stored as respective files, in the subject matter data storage devices 201, 202, 203 (described hereinafter). The file names can be existing names which had been assigned to the files (i.e. prior to entering the data via the I/O section 102) or can be new names which are assigned by the user. Whichever is the case, the file names must be in accordance with a predetermined convention for file name extensions, as described hereinafter.

The function of the authoring section 104, used in conjunction with the I/O section 102, is to prepare the scenario contents, i.e. generate information which relates respective events of the hypermedia title to specific subject matter data items, i.e. defines how the various subject matter data items (monomedia data objects) are to be presented during playing of the hypermedia title starting times and ending times of object presentation, etc.). Thus in the scenario, each event is linked to the name of one or more of the aforementioned subject matter data files. When completed, the authoring section 104 sends the scenario data in the temporary title data storage device 204 (described hereinafter), to be stored therein as the scenario file.

The function of the scenario analysis section 105 is to analyze the contents of the scenario of a hypermedia title, to obtain the respective names of the files which are to constitute the subject matter data of the hypermedia title.

The function of the subject matter list generating section 106 is to prepare a subject matter list file which contains storage location information for each of the subject matter data files which have been stored in the subject matter data storage devices 201, 202, 203. The storage location information is in a predetermined format whereby these stored subject matter data files can be directly accessed by the server computer 3. The subject matter list file is prepared by the subject matter list generating section 106 based on the subject matter data file names, which are obtained from the scenario analysis section 105, and the subject matter data storage device list 107. The scenario analysis section 105 then sends the subject matter data file list to the temporary title data storage device 204, to be stored therein.

The subject matter data storage device list 107 is a file whose contents list the respective data storage devices which are used to store each of the different types of monomedia data, e.g. a hard disk which stores video data, etc. The data storage devices are described (named) in that file in a format which is in accordance with the device naming convention used by the server computer 3.

The communication link 110 ccnceptually represents a communication path between the client control section 101 of the client terminal 1 and a server control section 301 of the server computer 3, and is configured of elements which are operated by the client terminal section and elements which are operated by the server computer 3. In response to commands from the client control section 101, the communication link 110 sends signals to the server control section 301 requesting execution of operations such as registering of a new hypermedia title, i.e. title registration commands, etc., and also sends results of title registration processing from the server control section 301 to the client control section 101.

The subject matter data storage devices 201, 202 and 203 of the common data storage section 2 are dedicated storage devices for respectively different types or subject matter data, which have been prepared by the subject matter preparation section 103. These might for example respectively be a video data storage device, a still picture storage device, and a text data storage device, i.e. storage devices which are appropriate for respectively different types of monomedia data. In the case of video data which is generally very large in scale, a high-capacity data storage device would typically be utilized. It should be noted that it would of course be possible to use more than three types of data storage device, if more than three types of subject matter data are utilized.

It should be understood that each "storage device", in the sense in which that term is used with reference to FIG. 1 and used in the appended claims, does not necessarily consist of a single physical storage device, and that the common storage section 2 actually consists of physical data storage devices in conjunction with one or more machines (e.g. server computers) for controlling them. Also, using well-known data file management techniques, each of the these "storage devices" can be constituted by a suitably controlled plurality of physical storage devices, e.g. hard disk units, or as a partition (volume) within a physical storage device.

These storage devices of the command data storage section 2 may be controlled by respectively different computers (e.g. servers) within the network, or all by a single computer. The essential feature is that the server computer 3 can access certain storage devices (204, 205, 206) constituting the common data storage section 2, either directly or via the network, and that each client terminal can also access certain ones of these storage devices (201, 202, 203, 204), via the network, using a suitable communication protocol.

In addition, the "information management server 3" in FIG. 1 actually represents functions which can be executed by a server computer, i.e. a computer which may have various other functions and also may control various data storage devices used for purposes unrelated to multimedia title management. Hence it should be understood that FIG. I is a conceptual system block diagram.

The temporary title data storage device 204 of the common data storage section 2 is a data storage device for temporarily storing (for a hypermedia title which is being newly created) a scenario file that is prepared by the user, and a subject matter list which is prepared by the subject matter list generating section 106 on the basis of the scenario contents, as described hereinafter. The title data storage device 205 is a data storage device which is used to store and manage the scenario file and subject matter data files of a hypermedia title which has been registered. Such a data storage device may have special requirements which are not necessary for the storage devices 201, 202, 203, e.g. it may be necessary for the data storage device 205 to permit high-speed read-out of stored video data, to enable real-time playing of video data contents of a hypermedia title at a client terminal, for example.

The title management information data storage device 206 stores title management information, in a file which will be referred to as the title management information file. This file contains respective entries for each of the registered hypermedia titles. The format of such an entry in the title management information file may be for example use the BNF (Backus Naur Form) syntax, as shown in FIG. 4. As shown, this basically consists of title information and keyword information. The title information servers to identify the hypermedia title, and to indicate storage location information for the title, and may also include the date of creation of the title and the author's name. In practice, the storage location information consists of the storage location (i.e. path) for the scenario file of the title, which contains storage location information for each of the subject matter data files of the hypermedia title. The hypermedia title is identified by a title number and title name. The keyword information consists of information for use in searching for the title, e.g. among lists (pages) of items. In this example, the keyword information consists of a sequence of notice board names.

The notice board data can be converted to corresponding HTML files, as described hereinafter with reference other embodiments of the invention), before being supplied to a client terminal, thereby providing a user of the client terminal with a graphical menu which permits easy searching and accessing of a desired title. The notice boards constitute a linked hierarchy, arranged in order of precedence of being searched, i.e. starting from a highest-order notice board, The key word information, in this example, sequentially lists the notice boards which would be used in searching for the corresponding title, in sequence of decreasing order, starting from the highest-order notice board. For example in FIG. 5, the sequence is:

(Forsale {Tickets [Ballet]})

In this case, the hypermedia title corresponding to this title management information entry is to be listed on the "Ballet" notice board, and to reach the "Ballet" notice board, i.e. the lowest-order notice board, it is necessary to first select the "Forsale" notice board.

During registration and management of hypermedia titles, the server control section 301 supplies processing instructions in a predetermined sequence to the various other sections of the server computer 3, and receives results of processing from these other sections. During the processing to register a title, the title registration section 302 serves to examine the subject matter data list which is stored in the temporary title data storage device 204, to determine whether all of the subject matter data files that are required for registering the title are already held in storage (i.e. as part of the aforementioned base subject matter data). If all of the necessary subject matter data are found to be available, then the title registration section 302 instructs the title data storage device 205 to store the subject matter data specified in the subject matter data list, in conjunction with the scenario data, as the data of the hypermedia title.

The title management information generating section 303 creates a new title management information file entry when a title is registered, and amends the management information file contents when a title is deleted, i.e. the corresponding entry in the management information file is deleted. The updated title management information file is then stored in the title management information data storage device 206.

Figure 6:
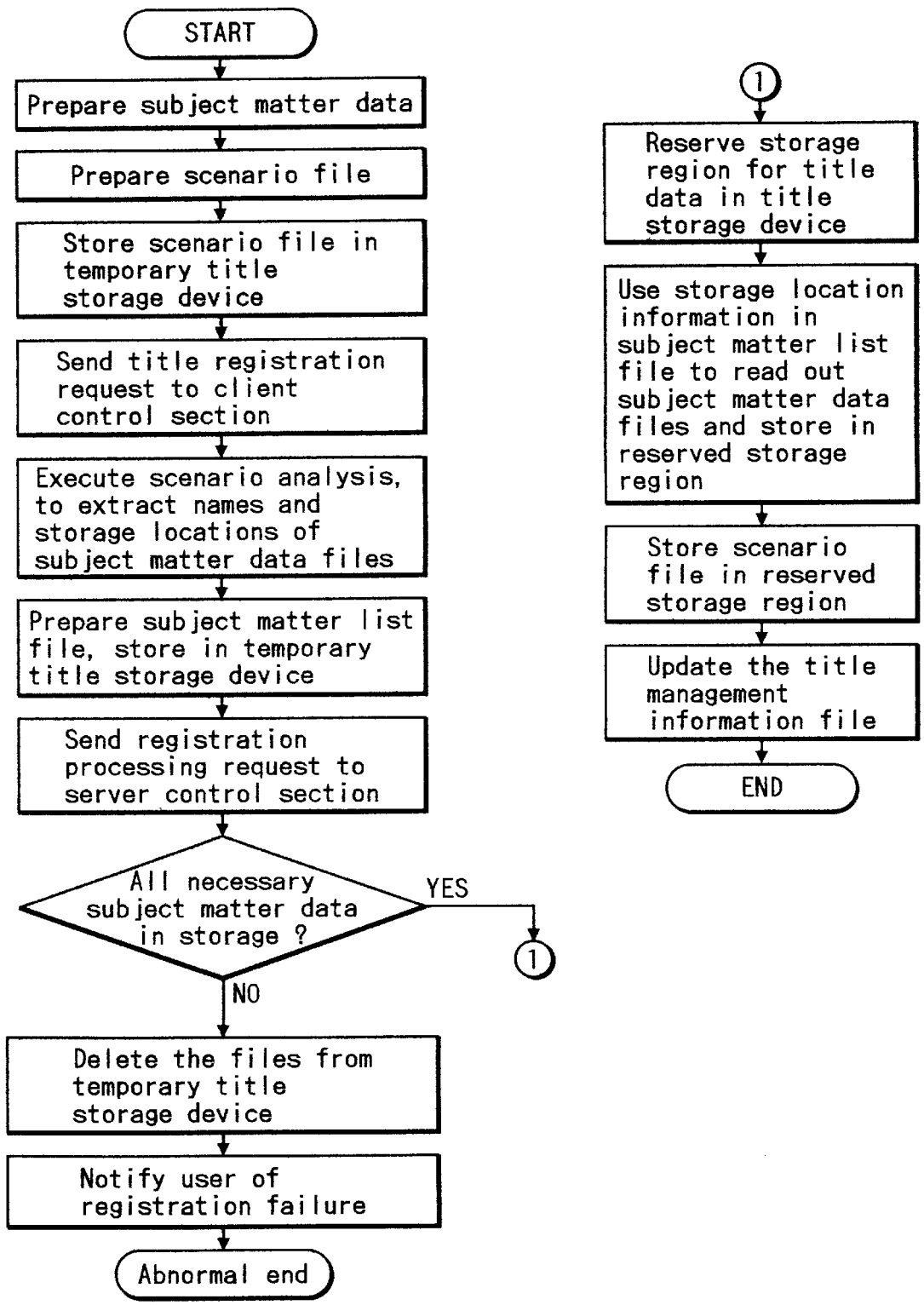
FIG. 6 is a flow diagram showing the title registration processing executed with the first embodiment.

The process of preparing and storing the subject matter data of a title that is to be registered, and then registering the title, will be described referring to the flow chart of FIG. 6. This shows the overall processing flow during title registration processing. Firstly, the user successively inputs the basic subject matter data, i.e. data which will form the basis of the subject matter data of the title, via the I/O section 102. These data then modified if necessary, using the subject matter preparation section 103, to obtain subject matter data to be used for the hypermedia title. These subject matter data are stored by the subject matter preparation section 103, as subject matter data files, in the respective appropriate ones of the data storage devices 201, 202, 203 of the common data storage section 2, i.e. in accordance with the respective type of media (video, text, still picture, etc.).

Figure 3:
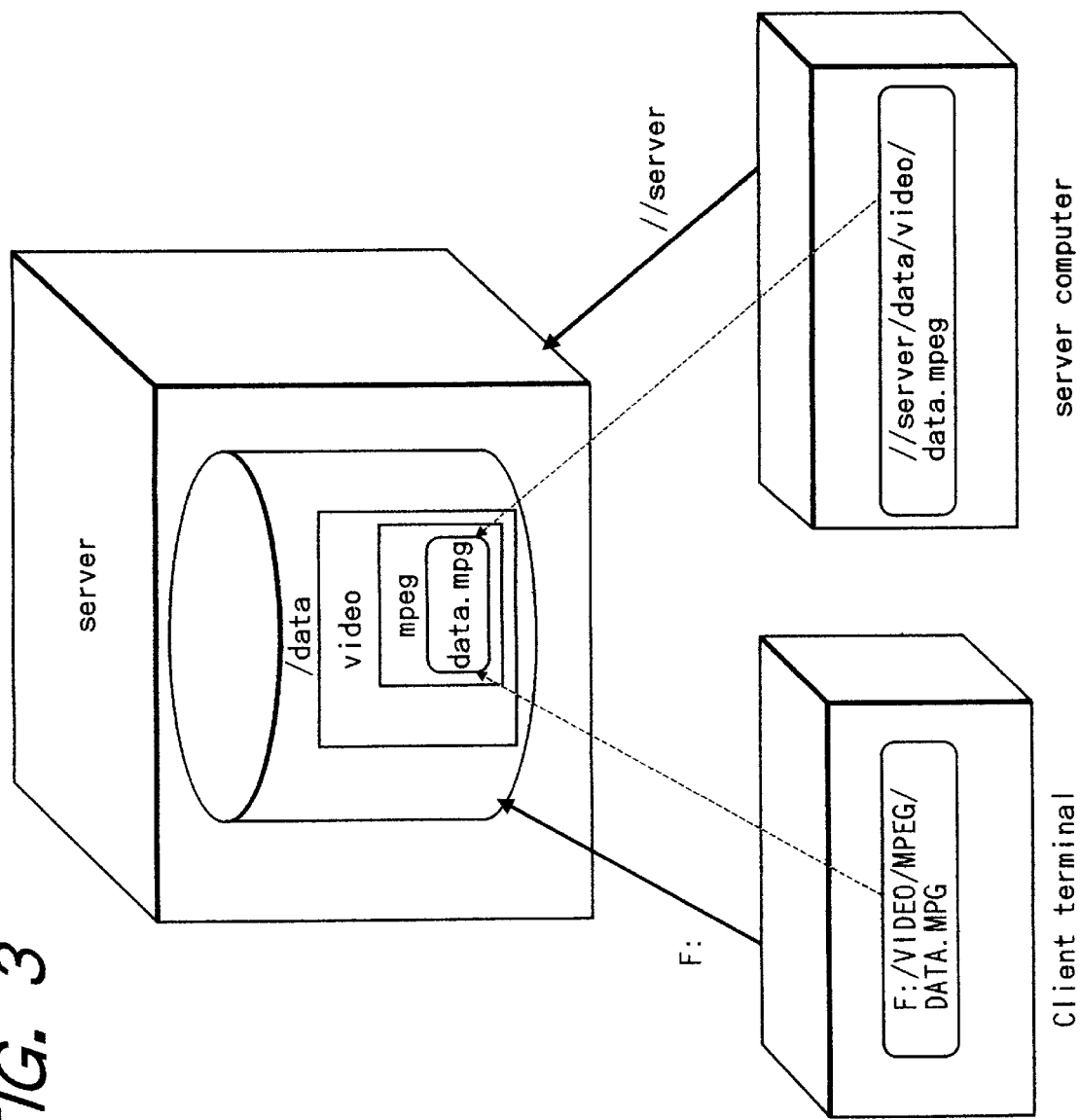
FIG. 3 is a conceptual diagram showing an example of differences between syntax used to express data file storage location information by a client terminal and by a server computer, respectively.

Each of these subject matter data files has a file name which includes a file name extension, indicating the type of monomedia data contained in the file (e.g. video data, audio data, etc.) For example, the extension ".mpg" might be used in the case of a file which contains video data that have been compressed in accordance with an MPEG standard. The storage location information for these subject matter data files, used by hte subject matter preparation section 103 in handling the files, is expressed using the syntax which is standard for the client terminal, i.e. which nay be different from that used by the server computer 3, as described hereinabove referring to the example of FIG. 3.

At that time, the user employs the authoring section 104 to arbitrarily select a file of subject matter data (specifically, data of a video or audio monomedia data object which will be played continuously from start to end of the hypermedia title) to serve as the base axis object of the hypermedia title, i.e. to provide a reference timing axis, to which the points of execution of various processing operations will be linked, during playing of the title.

The user then employs the I/O section 102 and authoring section 104 to generate the scenario contents, i.e. input the aforementioned information which relates respective events, defined at respective processing time points, to specific subject matter data files, as well as layout information for designating respective display screen positions and sizes with which video clips, still pictures, text items, etc. (i.e. contents of the specified subject matter data files) are to appear, etc. All of the processing time points are defined with respect to respective points on the aforementioned reference time axis. When completed, these scenario data are stored in the temporary title data storage device 204, as a scenario file, by the authoring section 104. A playing event in the scenario might be specified in the scenario, for example, by information having the significance:

"When frame number 650 of the base-axis video is reached, start to read out the (subject matter) video data file "vid6.mpg" from storage, and execute processing to decompress and play the video data, using a display window position (300, 200) and window size (560×210)".

The user then, again using the authoring section 104 in conjunction with the I/O section 102, generates a title registration request which is supplied to the client control section 101. The title registration request contains a list of specific items which are to be listed, as an entry for the newly registered hypermedia title, in the title management information file. These items include information for identifying the title, e.g. a title number and title name, and may also include information for enabling a user to search for the title, such as the aforementioned notice board information.

On receiving the registration request, the client control section 101 instructs the scenario analysis section 105 to read out from the temporary title data storage device 204 the scenario file for the new hypermedia title. The scenario analysis section 105 then extracts, from the scenario data thus obtained, the respective subject matter data file names, and passes these names to the subject matter list generating section 106. The subject matter list generating section 106 then, based on the respective file name extensions of these subject matter data files, judges the respective types of monomedia data in these subject matter data files. The subject matter list generating section 106 then examines the subject matter data storage device list 107, to determine the respective subject matter data storage devices in which the various subject matter data files are to be finally stored, and then generates information which will enable the server computer 3 to directly access these subject matter data files.

Figure 7:
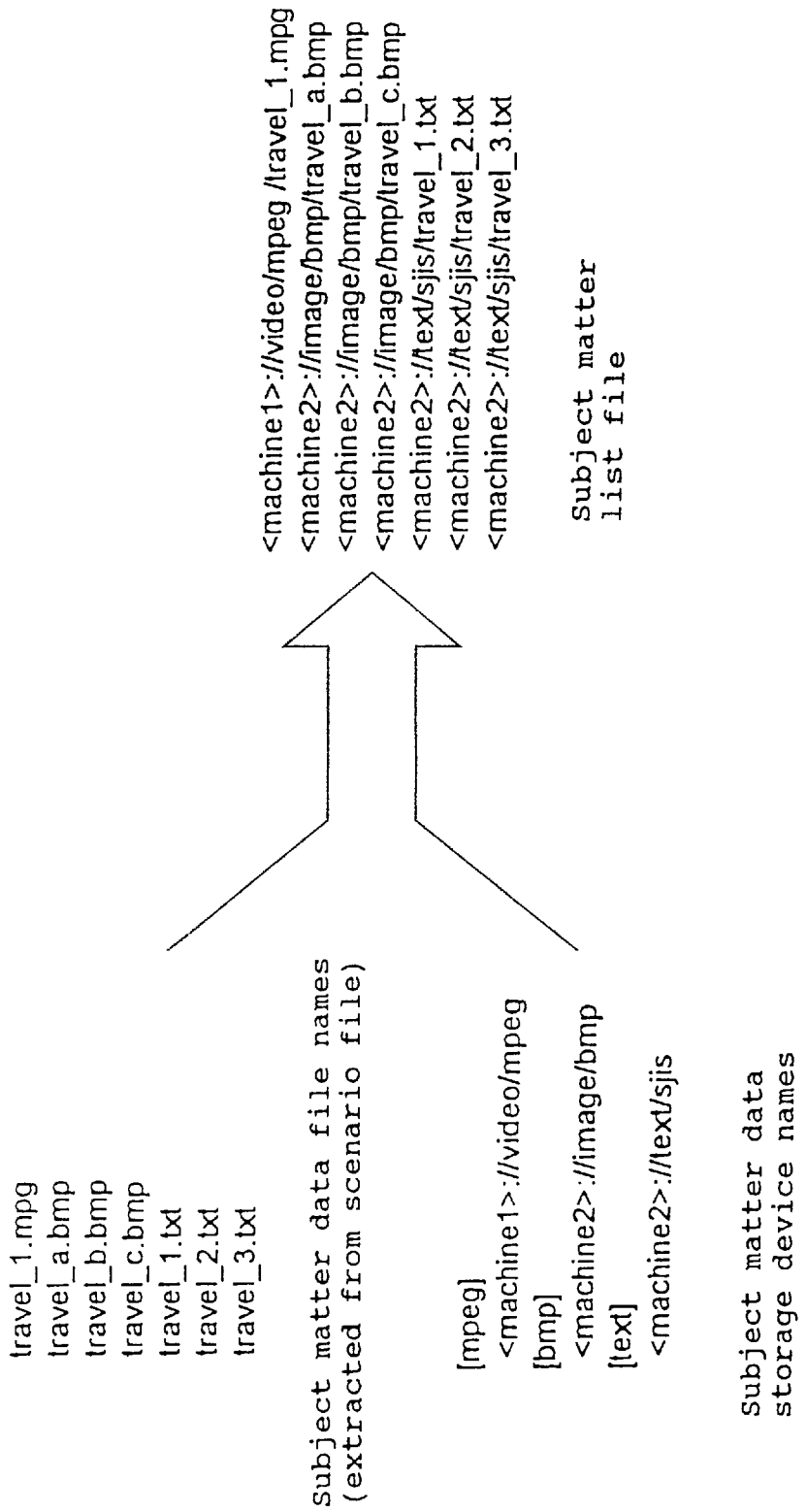
FIG. 7 is a diagram for illustrating the process of forming the subject matter list file, with the first embodiment.

Specifically this information consists of, for each subject matter data file, the file name, the name of the data storage device in which that file is stored. (i.e. in one of the subject matter data storage devices 201, 202, 203), and an absolute path to the storage location of that file within that data storage device. This information is then stored, as the subject matter list file, in the temporary title data storage device 204. FIG. 7 conceptually illustrates the process of preparing the subject matter list file.

Upon completion of preparing the subject matter list file and storing that file in the temporary title data storage device 204, the subject matter list generating section 106 sends a "preparation completion" signal to the client control section 101. On receiving this signal, the client control section 101 issues a registration processing request, via the communication link 110, to the server control section 301. The title registration section 302 then obtains the subject matter list file from the temporary title data storage device 204 and examines the file contents, to determine whether all of the subject matter data files which are listed in the file are actually stored in the subject matter data data storage devices 201, 202, 203 of the common data storage section 2. That is to say the subject matter list can be used by the server computer 3 to directly access each of the stored subject matter data files in that list. If it is found that all of the required subject matter data are not being stored, then the server control section 301 sends a notification of registration failure to the client control section 101, via the communication link 110. The client control section 101 then notifies the user, i.e. by generating a display message, that the title registration processing has ended in failure, and at the same time, deletes from the temporary title data storage device 204 ail data relating to that hypermedia title. This ends the title registration processing, in that case.

If however it is found that all of the listed subject matter data filed are being held in the subject matter data storage devices 201, 202, 203, then the title registration section 302 instructs the title data storage device 205 that the subject matter data files which are specified in the subject matter list file, are to be read out from the storage devices 201, 202, 203 and stored in the title data storage device 205, and that the scenario file will also be stored in data storage device 205.

The title data storage device 205 then reserves a data storage region for these files, reads out the specified subject matter data files from the locations in the storage devices 201, 202, 203 that are specified in the subject matter list file, and stores these subject matter data files at respective locations in the reserved storage region. The title registration section 302 then obtains the storage location for these subject matter data files within the title data storage device 205, reads out the scenario file which has been prepared by the user from the temporary title data storage device 204, adds the storage location information (with respect to storage device 205) for the respective subject matter data files to that scenario file, to obtain the final scenario file, then causes the title data storage device 205 to store that final scenario file within the aforementioned reserved storage region.

At that time, the title registration section 302 obtains from the title data storage device 205 the storage location Information for the final scenario file, and supplies that to the server control section 301, to be supplied to the title management information generating section.

The server control section 301 then sends a title management information file correction command to the title management information generating section 303, which responds by reading out the title management information file from the title management information data storage device 206, and adds to that file (i.e. as a new entry, for the hypermedia title which is to be registered) the title management information which has been generated for that hypermedia title. At that time, the title registration section 302 obtains from the title data storage device 205 the storage location information for the (final) scenario file, and supplies that information to the server control section 301, to be supplied to the title management information generating section 303, for insertion into the new entry in the title management information file together with the name of the scenario file.

It is important to note that, as can be understood from the example of FIG. 7, the storage location information for the subject matter files which is provided by the subject matter list file is always in a form which can be used by the server computer. The list of "subject matter data storage device names" is, more accurately a list which specifies, for each type of subject matter data, the name of the storage device where that type of data are stored (or the name of the computer which controls that storage device), and the directory in which the data are stored. That directory information is specified in relation to the root directory of that data storage device, so that the directory information can be combined with a file name to form the absolute path to that file within the specified storage device, i.e. to form an entry in the subject matter list file.

In addition, the contents of the list of "subject matter data storage device names" are expressed using a syntax which is identical to that used within the server computer to express file storage location information. Thus for example even if a client terminal user, when inputting subject matter data to be stored in the data storage devices 201, 202, 203 of FIG. 1, should use a syntax which is peculiar to the operating system of that client terminal, to express storage location information (e.g. using the "¥" symbol in place of the usual "/" in a path name), this does not effect the storage location information which is provided to the server computer as the subject matter list file. Hence, the problem described hereinabove referring to the example of FIG. 3 cannot arise.

As can be understood from the above description, with this embodiment of the invention, it becomes unnecessary to store subject matter data in the temporary title data storage device 204 during the title registration processing. Thus, the amount of data which must be transferred out of the temporary title data storage device 204 upon completion of the title registration procedure is very small, i.e. consisting only of the scenario data. Furthermore, since the subject matter data are directly transferred between respective storage devices of the common data storage section 2, i.e. do not have to be transferred via the network, the title registration processing can be efficiently executed at high speed.

Similar advantages of achieving high speed of title registration processing are provided by each of the other embodiments of the invention, described in the following.

A second embodiment of the invention will be described, referring first to the conceptual system block diagram of FIG. 8. This embodiment, as for the preceding embodiment, is an information management apparatus for handling hypermedia titles. However this embodiment differs from the preceding embodiment with respect to the part of the apparatus which executes processing to prepare the subject matter list file.

Specifically, with the apparatus of FIG. 1, a separate subject matter data storage device list 107 is provided in each client terminal. However with the second embodiment, only a subject matter data storage device list 107 is maintained only in the server computer 3, i.e. which can be used only by the server computer 3. As a result, the process of maintaining the contents of the subject matter data storage device list 107 correctly in correspondence with the actual data storage resources of the system is simplified. However, if there is a high frequency of requests for title registration processing, then since all processing which involves using the subject matter data storage device list 107 must be executed by the server computer 3, the load on the CPU of the server computer 3 will be accordingly increased. For that reason, the second embodiment is suited to use in cases in which the frequency of registering new hypermedia titles can be expected to be relatively low.

Figure 8:
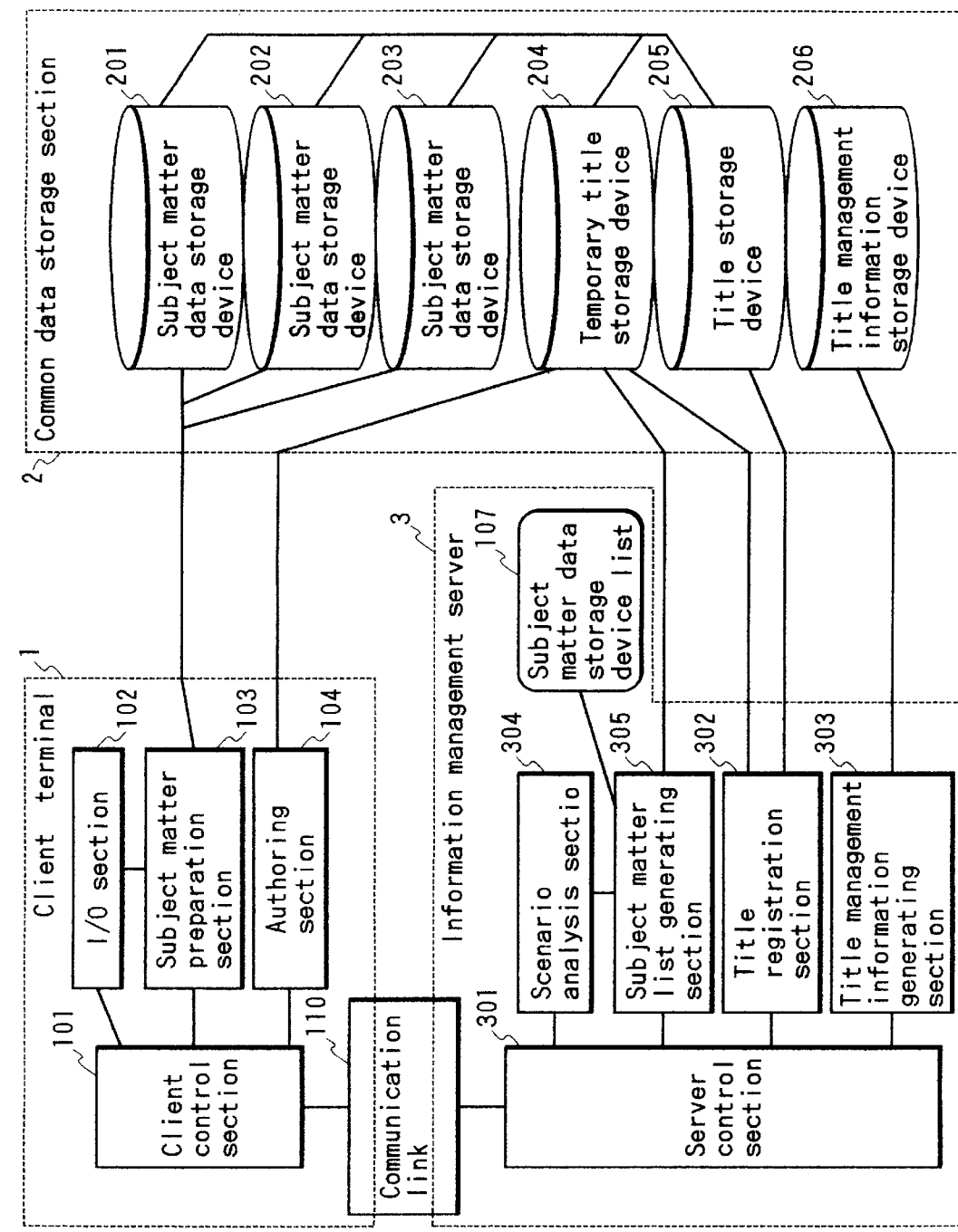
FIG. 8 is a general system block diagram of a second embodiment of an information management apparatus according to the present invention, in which only a single subject matter data storage device list is utilized, held at the server computer.

In FIG. 8, the subject matter preparation section 103, authoring section 104, communication link 110, temporary title data storage device 204, title data storage device 205, title management information generating section 303, and the subject matter data storage devices 201, 202, 203 are respectively identical to the correspondingly designated blocks in the embodiment of FIG. 1, so that detailed description of these will be omitted. However in FIG. 8, although the scenario analysis section 304 and the subject matter list generating section 305 have the same functions as the correspondingly designated sections in the embodiment of FIG. 1, this embodiment differs from the first embodiment in that the scenario analysis section 304 and subject matter list generating section 305 are disposed within the server computer 3. Moreover, although the subject matter data storage device list 107 has the same designation as that of the embodiment of FIG. 1, the subject matter data storage device list 107 is only provided within the server computer 3 of the second embodiment.

In FIG. 8, the server control section 301, in addition to the functions of the server control section 301 of the embodiment of FIG. 1, issues commands to the scenario analysis section 304 and subject matter list generating section 305, and also receives signals from these. In addition, the client control section 101 of the second embodiment differs from the client control section 101 of FIG. 1 in that it does not have the function of sending commands to, or receiving processing results from, the scenario analysis section 105 or the subject matter list generating section 106.

Figure 9:
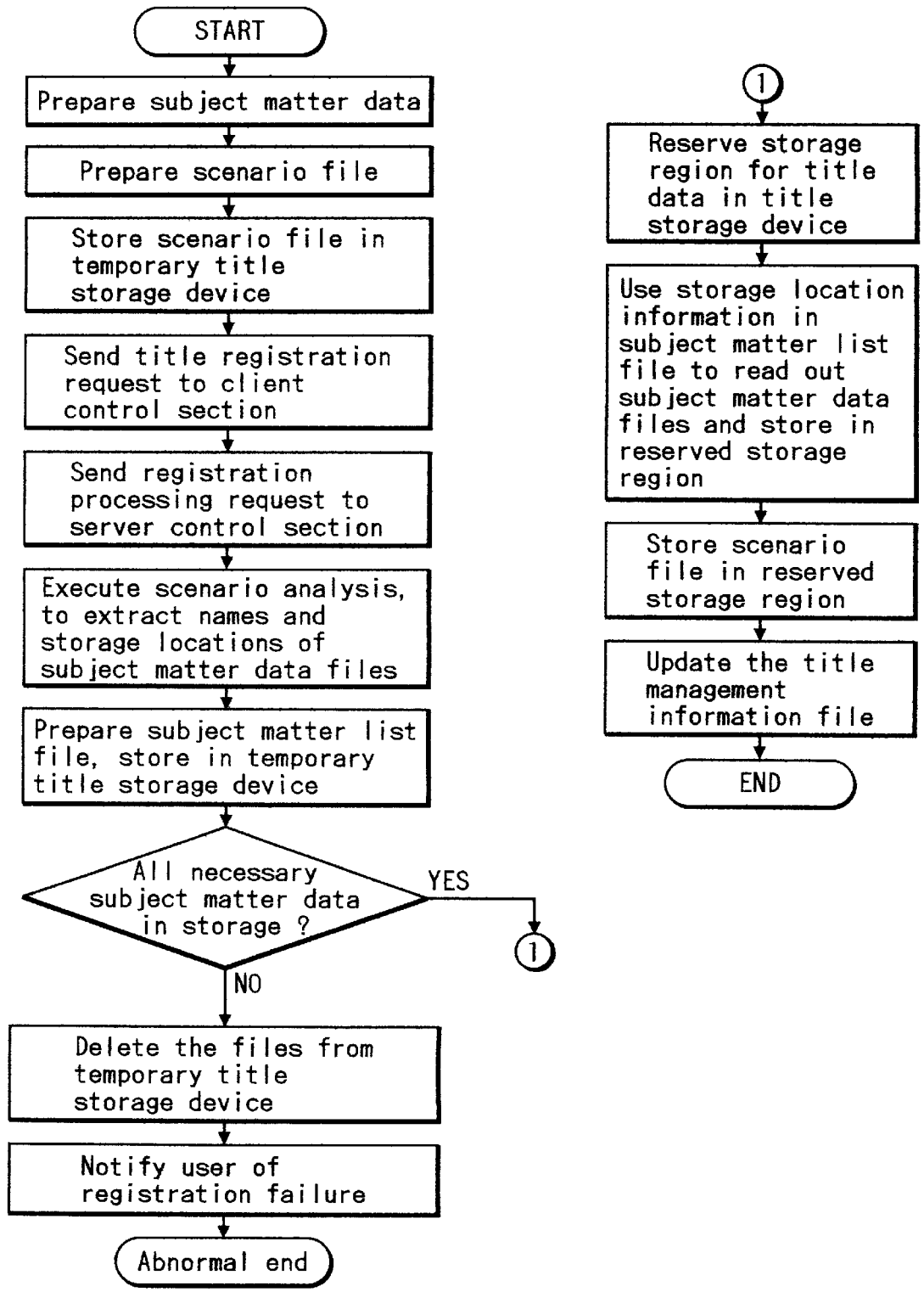
FIG. 9 is a flow diagram showing the title registration processing executed with the second embodiment.

The title registration processing of this embodiment will be described referring to the flow diagram of FIG. 9. Only the points of difference between this embodiment and the first embodiment will be described in detail. With this embodiment, after the user has prepared the scenario and stored the scenario data in the temporary title data storage device 204, processing steps identical to those of the first embodiment are successively executed, up to the point at which a title registration request is issued to the client control section 101. When the client control section 101 receives such a request, the only processing which it executes in response is to send the title registration request, via the communication link 110, to the server control section 301 of the server computer 3. In response, the server control section 301 sends a scenario analysis command to the scenario analysis section 304. The scenario analysis section 304 and subject matter list generating section 305 then execute the same processing with respect to the scenario analysis section 105 and subject matter list generating section 106 as that described hereinabove for the first embodiment, to prepare the subject matter list file, and to then store that file in the temporary title data storage device 204.

On completion of storing the subject matter list file, the subject matter list generating section 305 notifies the server control section 301 that preparation of the subject matter list has been completed. In response, the server control section 301 executes the same processing which has been described for the server control section 301 of the embodiment of FIG. 1, thereby completing the title registration processing (if all of the required subject matter data are found to be held in storage), or executing an abnormal end of the title registration processing.

A third embodiment of the invention will be described, referring first to the conceptual system block diagram of FIG. 10. This embodiment as for the preceding embodiments, is an information management apparatus for handling hypermedia titles, and is basically similar to the embodiment of FIG. 8. More specifically, the third embodiment can be considered as basically consisting of a title information management section, constituted by the information management apparatus of FIG. 8, which is connected via an external database interface section to an external relational database 400, i.e. is connected such as to enable a user of the information management apparatus to also use the external relational database.

Figure 10:
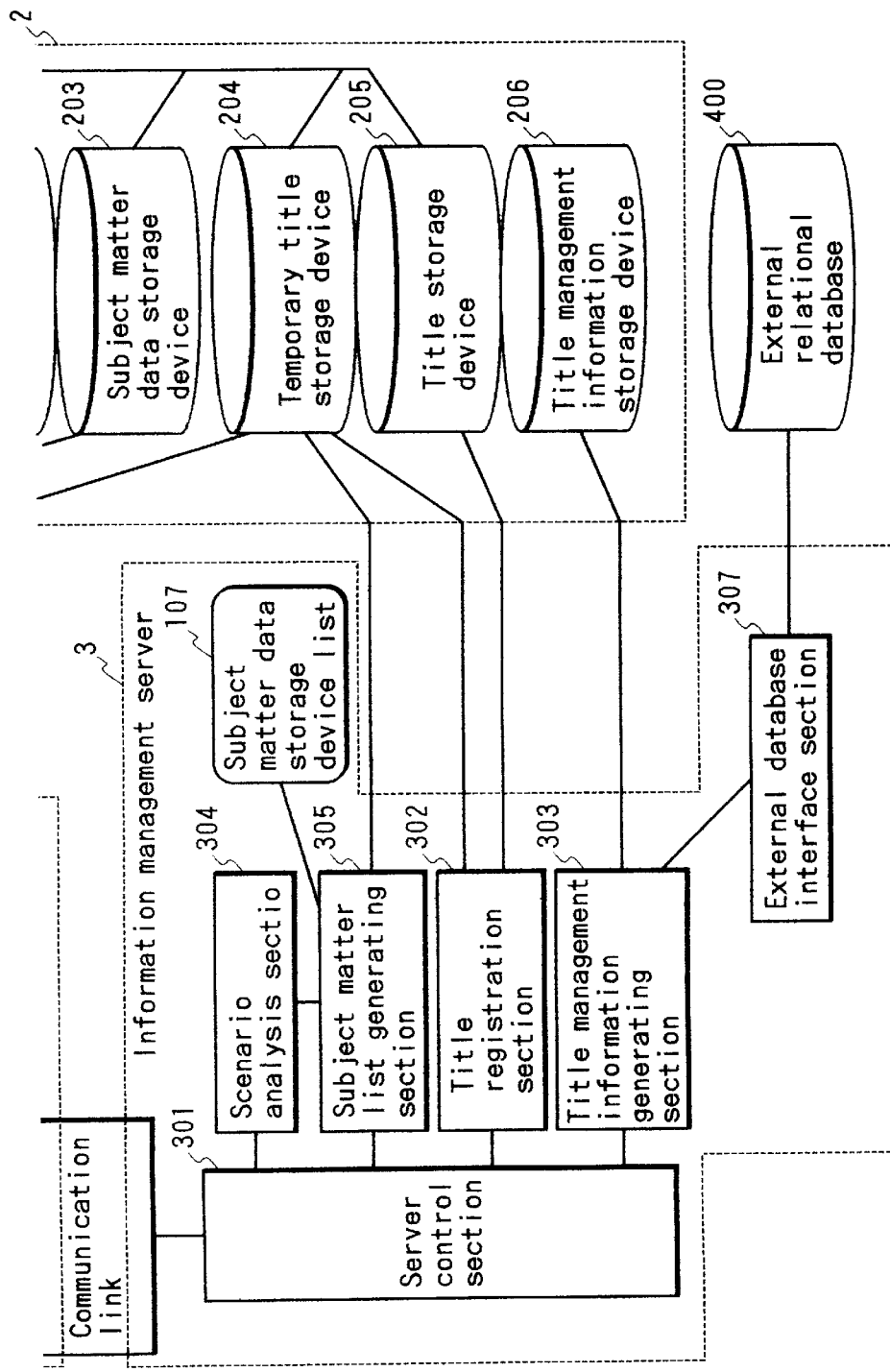
FIG. 10 is a general system block diagram of a third embodiment of an information management apparatus according to the present invention, which interfaces with an external relational database.

In FIG. 10, the client terminal 1 is identical to the client terminal 1 of FIG. 10, while the subject matter data storage devices 201, 202, 203 temporary title data storage device 204 and title data storage device 205 of the common data storage section 2 are respectively identical to the correspondingly designated sections in the embodiment of FIG. 8.

In addition, in the server computer 3 of FIG. 10, the subject matter data storage device list 107, the title registration section 302, the scenario analysis section 304, and the subject matter list generating section 305 are respectively identical to the correspondingly designated sections in the embodiment of FIG. 8. Furthermore, the title management information generating section 303 of this embodiment has identical functions to to the correspondingly designated section in the embodiment of FIG. 8, but differs in that, in addition to sending/receiving information to/from the title management information data storage device 206, the title management information generating section 303 of this embodiment also sends/receives information to/from from the external database interface section 307 of the server computer 3.

The external database interface section 307 receives title management information which is prepared by the title management information generating section 303, and issues instructions for operating the external relational database, with these instructions being expressed in SQL. The external relational database interface section 307 also generates the title management information file, and executes data alteration, addition, or deletion to maintain the title management information file in a continuously updated condition. That is to say the external database interface section 307 performs the same functions in this embodiment, in relation to the title management information generating section 303, as the functions performed by the title management information data storage device 206 of the embodiment of FIG. 8, but in addition has the function of executing data acquisition from the external relational database 400, and issuing SQL instructions to the external relational database 400.

By using this apparatus, a user is enabled to use the external relational database 400, i.e. to find information such as notice board information, hypermedia title information, etc., with use of various types of high-level data search techniques being possible.

Figure 11:
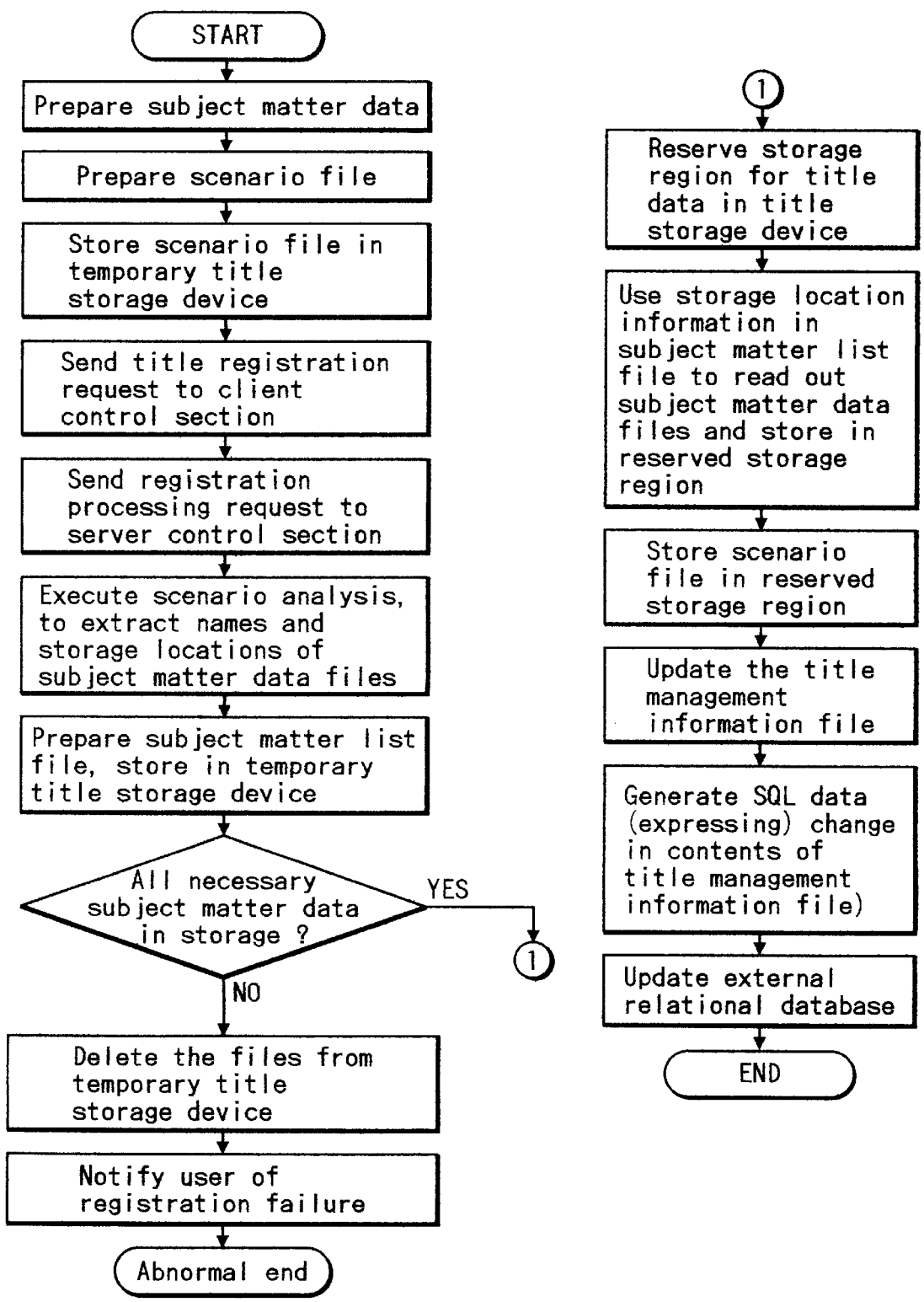
FIG. 11 is a flow diagram showing the title registration processing which is executed with the third embodiment.

The process of title registration with this embodiment will be described referring to the flow diagram of FIG. 11.

With this apparatus, the processing flow is basically identical to that of the apparatus of FIG. 8, with the finally registered hypermedia title being stored in the title data storage device 205. Thereafter, the title management information generating section 303 acquires the title management information file from the external database interface section 307, and updates that file by adding to it an entry relating to the newly registered hypermedia title. The updated title management information file is then outputted to the external database interface section 307. The external database interface section 307 compares the title management information file which it thus receives with the previous version of that file (i.e. which is still being held stored in the data storage device 206), to determine the differences between the previous version and the updated file. The external database interface section 307 then issues SQL instructions to the external relational database, for correcting the external relational database in accordance with these differences.

FIGS. 12 is a diagram showing an example of the process of generating correcting the contents of the external relational database 400, based on the differences between the title management information file prior to registering a new hypermedia title and the title management information file after the new hypermedia title has been registered. As illustrated in FIG. 12, the external database interface section 307 sends the completed SQL data to the external relational database, to correct the contents of that database. The external database interface section 307 then replaces the previous version of the title management information file, in the title management information data storage device, by the updated title management information file. This ensures that the most up-to-date information is continuously provided to the title management information generating section 303. This completes the title registration processing, with this embodiment.

It should be noted that it would similarly be possible to add the external relational database interface section 307 of FIG. 10 to the server computer of the apparatus of FIG. 1, or the apparatus of FIG. 10, to thereby connect each of these embodiments to an external relational database.

It can be understood from the above that with the third embodiment of the invention, a feature is added whereby the title management information file can be used to generate SQL data to be sent to an external relational database, whose contents can include the hypermedia title names, in addition to various other information. Thus, this embodiment greatly extends the range of applicability of an information management apparatus.

It can be understood that with the embodiments of the invention described above, the subject matter data of a multimedia title such as a hypermedia title, after being prepared by a user of a client terminal in a client-server network, can be made directly available to the information management server which is to manage the multimedia title, and that the invention enables a high speed of processing to be achieved for registering a new multimedia title. Overall increased efficiency of managing multimedia titles is thereby made possible. In addition, problems due to differences between different forms of expressing information by client terminals and server computers having respectively different types of operating system, and in particular, differences in the syntax employed to express file storage location information, are eliminated.

A fourth embodiment of an information management apparatus according to the present invention will be described in the following. All of the hypermedia title management functions of this embodiment are implemented in a computer system which serves a number of client terminals, with respect to management of multimedia titles, via a network, and that computer system will be referred to in the following as the information management server. The basic features of this embodiment are as follows.

To register a new hypermedia title, the information management server analyses the contents of the scenario file of that hypermedia title (received from the client terminal which requests registration of the hypermedia title), to obtain the storage location information for each of the subject matter data files, then performs syntax conversion to change the storage location information (i.e. path name information) obtained from the scenario file into corresponding storage location information of the type which is utilized by the information management server itself. The converted storage location information are then inserted into the scenario file to replace the original storage location information, to obtain a converted scenario file. The converted scenario file is then stored locally by the information management server. The respective subject matter data files of such a hypermedia title may be stored locally, i.e. in a file storage device which is controlled by the information management server, or at some other computer system (e.g. server) of the network. In the latter case, it is necessary to include the name of the other computer system in the storage location information in the converted scenario file.

Thereafter, when a client terminal sends an acquisition request to the information management server for one of the registered hypermedia titles, the information management server reads out the converted scenario file for that hypermedia title, then converts the subject matter data file storage location information in that scenario file into a form which is used by the requesting client terminal, i.e. executes conversion of the subject matter data storage location information syntax, and inserts the information into the scenario file, to obtain a scenario file which can be utilized by that particular client terminal. The resultant scenario file is then sent to the requesting client terminal. The requesting client terminal can then use the scenario file as desired, i.e. to play the hypermedia title, to obtain the contents of specific subject matter data files of that hypermedia title (e.g. for use in creating a new hypermedia title), etc.

Figure 13:
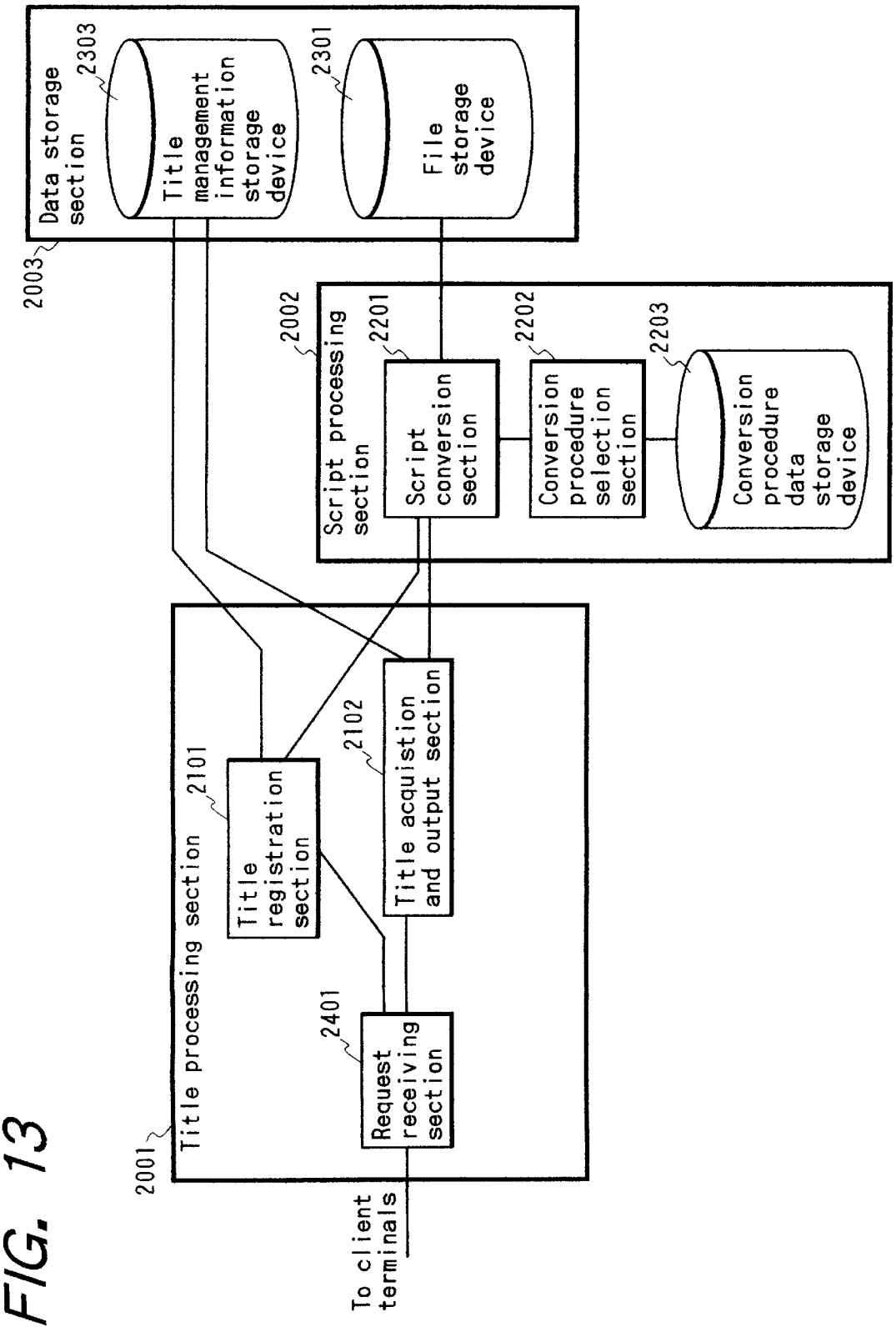
FIG. 13 is a general system block diagram of a fourth embodiment of an information management apparatus according to the present invention.
Figure 15:
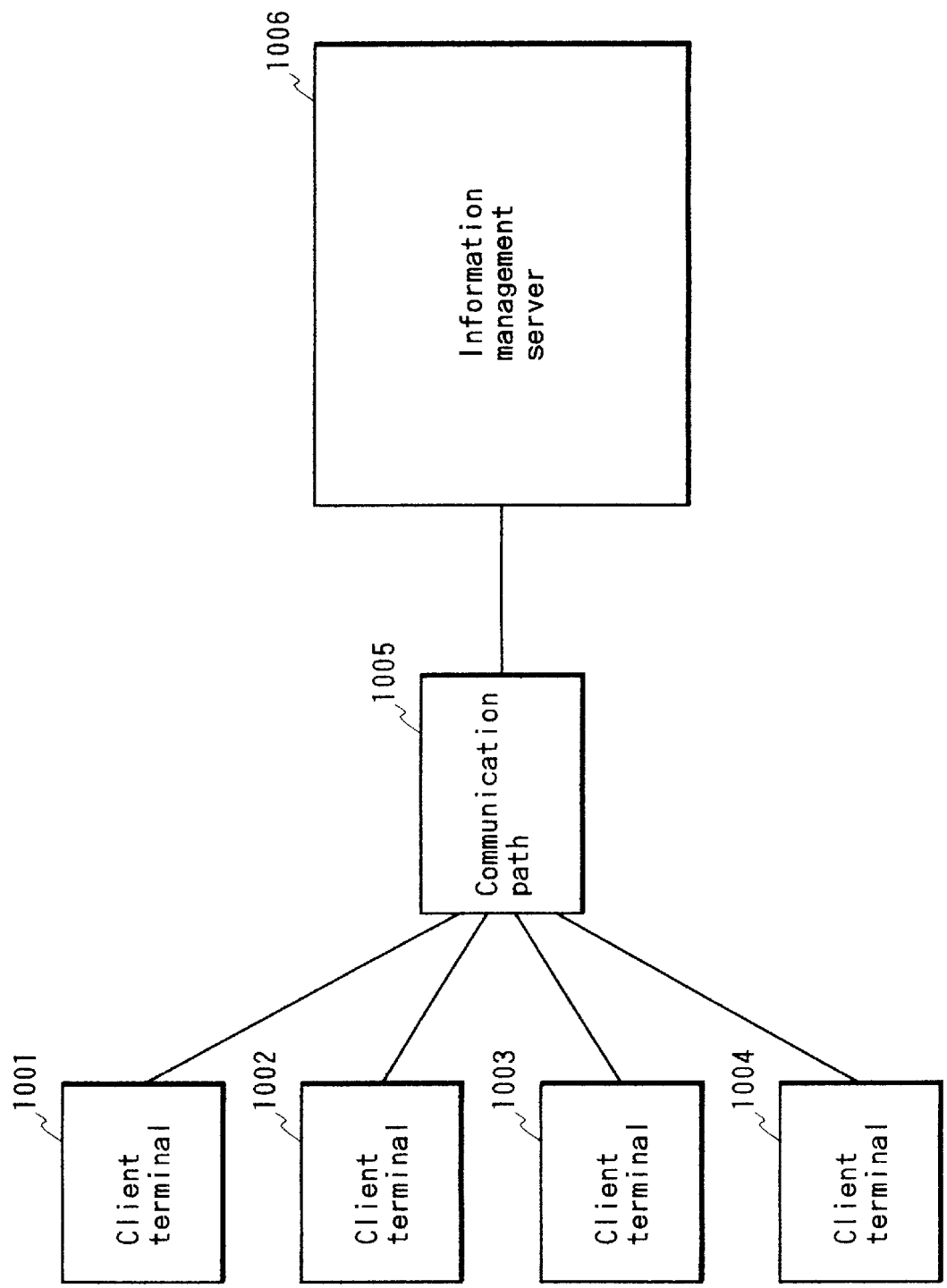
FIG. 15 is a basic system block diagram showing connections between an information management server and respective client terminals, with the fourth embodiment.

FIG. 13 is a conceptual system block diagram of the information management server of this embodiment, and FIG. 15 is a general system block diagram illustrating how the information management server 1006 is connected via a communication path 1005 (i.e. via a client-server network) to respective client terminals 1001 to 1004. It will be assumed that with this embodiment, as indicated in FIG. 15, each of the client terminals can access only the information management server 1006. As described for the preceding embodiments, the client terminals 1001 to 1004 may use a syntax for expressing file storage locations (i.e path name information) which is different from that used by the information management server to express the same storage location information. In addition, the client terminals 1001 to 1004 may use types of file storage locate on information syntax which are respectively different from one another. It should be noted that in the following description of embodiments, it will generally be assumed that each of the client terminals of FIG. 15 can also access other computer systems (e.g. servers), not shown in FIG. 15, which are connected to the network, i.e. to store and access data files at these other computer systems.

Moreover, there are various possible ways in which a client terminal may generate a scenario file. Firstly, the scenario data may be expressed in a single scenario file, as assumed for the preceding embodiments and as illustrated in the example of FIG. 14A. Alternatively, the scenario data may for example be expressed in a pair of files, with one of these being a header file, containing only information directly relating to subject matter file storage location information (i.e. does not contain information relating to the sequence of events of the hypermedia title), as illustrated in diagram (B1) of FIG. 14A, and the other file constituting the actual scenario file, i.e. which contains event sequence information linked to the contents of respective subject matter data files, as illustrated in the example of diagram (B2) of FIG. 14B.

Specific examples of such scenario files are shown in FIGS. 16A, 16B and 16C. FIG. 16A shows an example of part of a scenario file, of the single-file format shown in FIG. 14A, which is created by a first client terminal which accesses the information management server, designated as client terminal 1. FIG. 16B shows an example of how the same scenario file portion, again in the single-file format, as it might be expressed using the storage location information syntax employed by the information management server. As shown, respectively different forms of storage location information (path name) syntax are used by the client terminal 1 and the information management server, for the same storage location information, e.g. the information designated by letters A and B in FIGS. 16A, 16B respectively.

Furthermore, another client terminal which accesses the information management server may generate a scenario file in the two-file format of FIG. 14B, as in the example of FIG. 16C. In this example, the storage location information for each subject matter data file is contained only in the header file of the two-file pair, e.g. as indicated by letter C in diagram (C1) of FIG. 16C, whereas only the file names and file numbers of the subject matter data files are listed in the "scenario file" member of the two-file pair, shown in diagram (C2) of FIG. 16C, e.g. with the file name indicated as C' corresponding to the storage location information designated as C in diagram (C1).

It can thus be understood that there may not only be differences in forms of storage location information syntax, between the respective representations of a scenario file by a client terminal and by the information management server, but also differences in the scenario file structure. The difference in syntax may simply consist of using the "¥" symbol in place of the "/" symbol as a path name delimiter, or may also consist of use of a relative path name by a client terminal and use of an absolute path name by the information management server for the same path, as illustrated by the portions A and B in FIGS. 16A and 16B respectively. Thus for example, if the scenario file of FIG. 16B is to be sent to client terminal 1 by the information management server, the syntax must first be converted to the form shown in FIG. 16A.

In general, the process of converting a part of the scenario information or of the title management information from a form which can be utilized by a client terminal to a form which can be utilized by the information management server, or vice-versa, will be referred to in the following description and in the appended claims as script conversion. The only type of script conversion which is specifically described with reference to the embodiments consists of syntax conversion of subject matter data file location information. However it should be noted that the invention is not limited to such a type of script conversion.

As shown in FIG. 13, the information management server of this embodiment basically can be divided into three sections, i.e. a title processing section 2001, a script processing section 2002 and a data storage section 2003. The title processing section 2001 consists of a request receiving section 2401, a title registration section 2101 and a title acquisition and output section 2102. The script processing section 2002 consists of a script conversion section 2201, a conversion procedure selection section 2202 and a conversion procedure data storage device 2203. The data storage section 2003 consists of a title management information storage device 2303 and a file storage device 2301. The data storage section 2003 is made up of data storage devices which are controlled by the information management server, i.e. form part of the information management server system. It should be noted that the "file storage device 2301" may actually consist of a plurality of physical storage devices (e.g. hard disk units), respectively suited to storing different types of monomedia data such as video data, still picture data, text data, etc. The file storage device 2303. is used to store data of registered hypermedia titles (i.e. a scenario file and set of subject matter data files for each registered hypermedia title), and is also used by the client terminals of the network to store and acess data files, e.g. when users of the client terminals are creating hypermedia titles. That is to say, the file storage device 2301 represents data storage which is used in common by the information management server and each of the client terminals which can access the information management server.

The title management information storage device 2303 serves to store a title management information file (consisting of respective title management information entries for each of the registered hypermedia titles, as described for the preceding embodiments).

Although not shown in the drawings, the script conversion section 2201 includes a memory having stored therein data, e.g. in the form of a table, which relates each of the client terminals to a corresponding appropriate script conversion procedure. In the case of those client terminals which generate scenario files in a fixed format (e.g. the single-file format described above referring to FIGS. 14A, 14B) and which each use the same type of data location information syntax, a single predetermined script conversion procedure (referred to in the following as the standard script conversion procedure) can be used. In the case of other client terminals, a specific suitable script conversion procedure must be selected and used.

The operation of this embodiment will be described referring first to FIG. 17, which shows the basic operation flow. The operation steps are as follows:

Step 1: the request receiving section 2401 receives a request from one of the client terminals for execution of a processing operation.

Step 2: the type of request is evaluated.

Step 3: if the request is for registration of a new hypermedia title, then the title registration section 2101 executes the necessary processing.

Step 4: if the request is for acquisition of a specified hypermedia title, then the title acquisition and output section 2102 executes the necessary processing.

Figure 18:
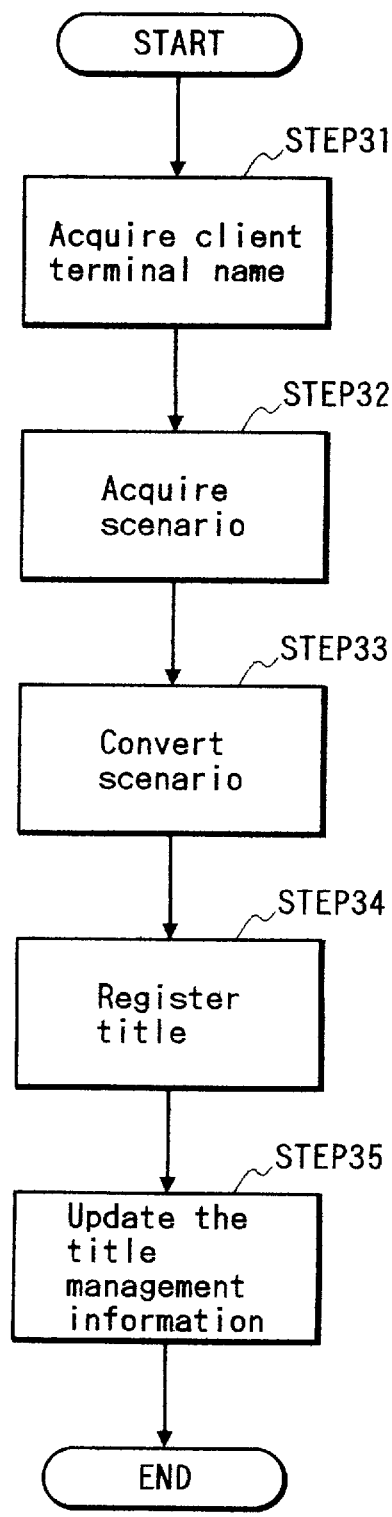
FIG. 18 is a flow diagram showing the title registration processing which is executed with the fourth embodiment.

The contents of the title registration processing (step 3) will be described referring to the flow diagram of FIG. 18. The operating flow shown in FIG. 18 is as follows:

Step 31: the title registration section 2101 acquires the name of the requesting client terminal.

Step 32: the title registration section 2101 acquires from the client terminal the scenario file of the hypermedia title which is to be registered.

Step 33: the script conversion section 2201 executes conversion processing of the subject matter data storage location information contained in the scenario file, to obtain a converted scenario file in which the subject matter data file storage location information are in accordance with the syntax used by the information management server.

Step 34: the converted scenario file is stored in the file storage device 2301 by the title registration section 2101.

Step 35: the title management information file held in the title management information storage device 2303 is updated, by addition of an entry which specifies information relating to the newly registered hypermedia title.

Figure 19:
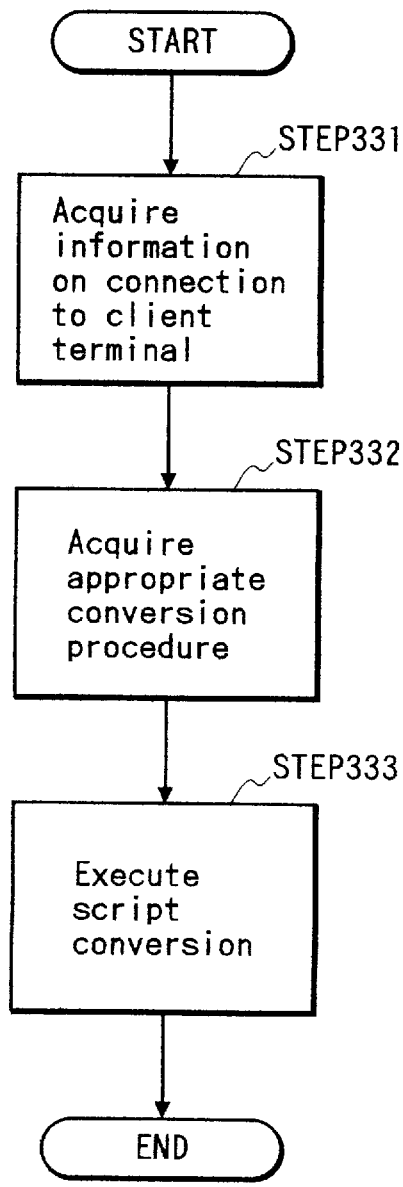
FIG. 19 is a flow diagram showing a scenario conversion processing which is executed with the fourth embodiment.

FIG. 19 is a flow diagram of the scenario conversion processing executed in step 33 of FIG. 18. The operation flow is as follows:

Step 331; based on the terminal name of the requesting client terminal, the script conversion section 2201 acquires connection information relating to that client terminal.

Step 332: based on the contents of the connection Information, the script conversion section 2201 requests the conversion procedure selection section 2202 for the script conversion procedure which is appropriate for the client terminal concerned. The script conversion section 2201 includes a memory (not shown in the drawings) which holds respective sets of connection information for each of the client terminals. Each of these sets of connection information may include information identifying an appropriate script conversion procedure for use in converting a client-generated scenario file to a scenario file which is in accordance with the file storage location syntax of the information management server. In response to a request from the script conversion section 2201 for a script conversion procedure, the conversion procedure selection section 2202 selects the specified one of the set of script conversion procedures which are held stored in the conversion procedure data storage device 2203, and passes the script conversion procedure data to the script conversion section 2201.

If the script conversion section 2201 does not specify a particular script conversion procedure to the conversion procedure selection section 2202, the conversion procedure selection section 2202 selects a standard script conversion procedure, which only executes path name conversion, i.e. converts each path name specified in the scenario file from the client terminal into a corresponding path name which is in accordance with the syntax used by the information management server. This type of conversion is used if the scenario file sent by the client terminal consists only of a single file in a standard format, i.e. does not consist, for example, of a (header file+scenario file) pair.

Step 333: the script conversion section 2201 executes conversion of the scenario sent from the client terminal, using the obtained script conversion procedure.

The concept of "connection information" used in step 331 is as follows. Each set of connection information held in the script conversion section 2201 can express the relationship between the path name syntax used within that client terminal and the corresponding path name syntax which is used in the information management server, and may also include (if the standard conversion procedure mentioned above cannot be used) the name of the script conversion procedure which is to be used for conversion of a scenario which is sent from that client terminal to the information management server.

FIG. 23A shows an example of a format for such connection information. FIG. 23B shows a corresponding example of actual sets of connection information for respective client terminals. In the case of the client terminal identified as client01, for example, the file storage location syntax used in that client terminal designates the "/home/data" directory of the information management server as "G" (i.e. as a "virtual disk" having that drive letter) and the "/home/data" directory of another server of the network (that server being identified as "server1") as "H". With the client01 terminal, it is necessary to use a specific script conversion procedure (for example, because that terminal utilizes a two-file scenario file structure) which is stored in the conversion procedure data storage device 2203 under the name "001.prc". That is also necessary for client02, which utilizes a different type of scenario file structure from that of client01, and so requires use of a different script conversion procedure.

In the case of the client terminal which is designated as client03 in FIG. 23B, the connection information for that client terminal does not specify a script conversion procedure name. In such a case, a standard script conversion procedure is utilized, of the form described hereinafter referring to FIG. 20A, which only path name conversion (for example, to convert the path information "A" indicated in FIG. 16A to the corresponding path information "B" indicated in FIG. 16B). executes conversion of path names of the subject matter data files of the scenario file.

In general, it will only be necessary to use the standard script conversion procedure, i.e. executing only path name conversion, with the other script conversion procedures being required only in the case of a non-standard scenario file structure being used at a client terminal. As a result, it is made easier to add new client terminals to the system (i.e. client terminals which are permitted to access the information management server in relation to hypermedia title creation or access), since it becomes less necessary to create new script conversion procedure files for each new client terminal which is added. Hence, the overall amount of processing required for hypermedia title registration is reduced.

Figure 20A:
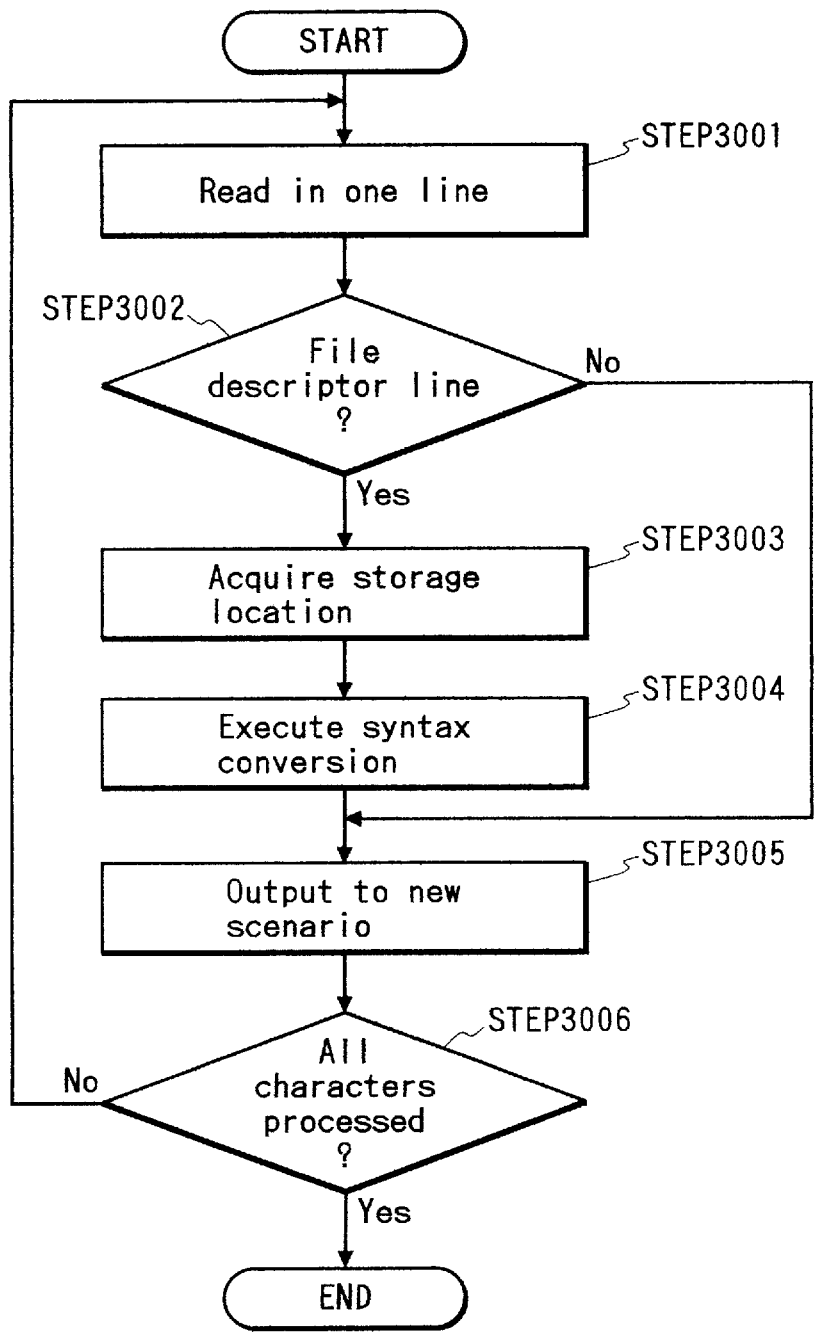
FIGS. 20A and 20B are flow diagrams respectively showing a script conversion procedure executed for the case of a single-file scenario file and the case of a double-file type of scenario file which includes a header file.
Figure 20B:
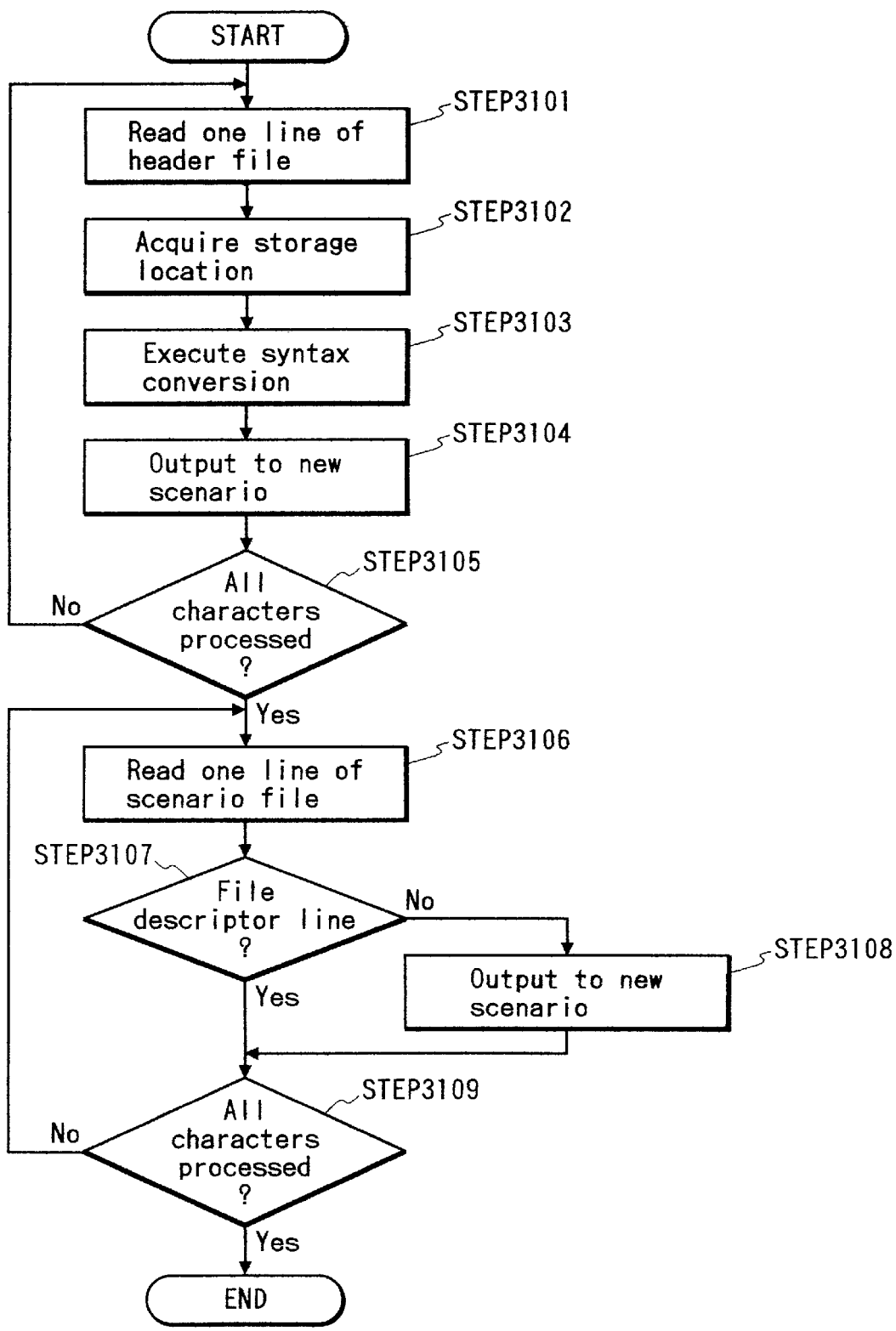

FIGS. 20A, 20B show respective flow diagrams of script conversion procedures for executing step 333 of the flow diagram of FIG. 19. The processing of FIG. 20A is for use in the case of scenario data received from a client terminal which consists of a single file in standard format, i.e. as in the example of FIG. 16A. The processing of FIG. 20B is for use in the case of scenario data received from a client terminal which consists of a pair of files, i.e. header file and scenario file, as shown in the example of FIG. 16c.

The steps in the script conversion procedure of FIG. 20A are as follows:

Step 3001: a line of the scenario file is read in.

Step 3002: a decision is made as to whether that line is a file descriptor line, i.e. contains file storage location information. If so, step 3003 is executed.

Step 3003: the connection information for the client terminal concerned is examined, to find the equivalent storage location information (path name information) of that line expressed with the syntax employed within the information management server.

Step 3004: the contents of that line are converted to the storage location information syntax form which has been determined in step 3003.

Step 3005: the converted line is entered into the new (converted) scenario file.

If it is found in step 3002 that the line which has been read in is not a file descriptor line, i.e. does not contain storage location information, or if step 3005 has been executed, then step 3005 is executed.

Step 3006: if the line which has been read in is the final line of the scenario file, then the conversion processing is terminated. Otherwise, processing returns to step 3001.

The steps in the script conversion procedure of FIG. 20B are as follows;

Step 3101: a line of the header file is read in.

Step 3102: the connection information for the client terminal concerned is examined, to find the equivalent storage location information (path name information) of that line expressed with the syntax employed within the information management server.

Step 3103: the contents of that line are converted to the storage location information syntax form which has been determined in step 3102.

Step 3104: the converted line is entered into the new (converted) scenario file.

Step 3105: if the line which has been read in is not the final line of the header file, then processing returns to step 3101, Otherwise, step 3106 is executed.

Step 3106: a line of the scenario file is read in.

Step 3107: if that line is not a File descriptor line, then step 3108 is executed. If the line is a subject matter file descriptor line (i.e. has already been read from the header file), step 3109 is executed.

Step 3108: the line which has been read in is entered into the new scenario file.

Step 3109: if the line is the final line of the scenario file, then the processing is terminated. Otherwise, processing returns to step 3106. FIG. 21 is a flow diagram of the hypermedia title acquisition processing (step 4 of FIG. 17). The operations of FIG. 21 are as follows:

Step 41: the title acquisition and output section 2102 obtains the name of the client terminal which sent the title acquisition request.

Step 42: the scenario file of the requested hypermedia title is obtained from the file storage device 2301.

Step 43: the script conversion section 2201 converts the contents (i.e. storage location information contents) of the obtained scenario file into the form which is appropriate for the requesting client terminal.

Step 44: the script conversion section 2201 transfers the resultant converted scenario to the requesting client terminal.

Figure 22A:
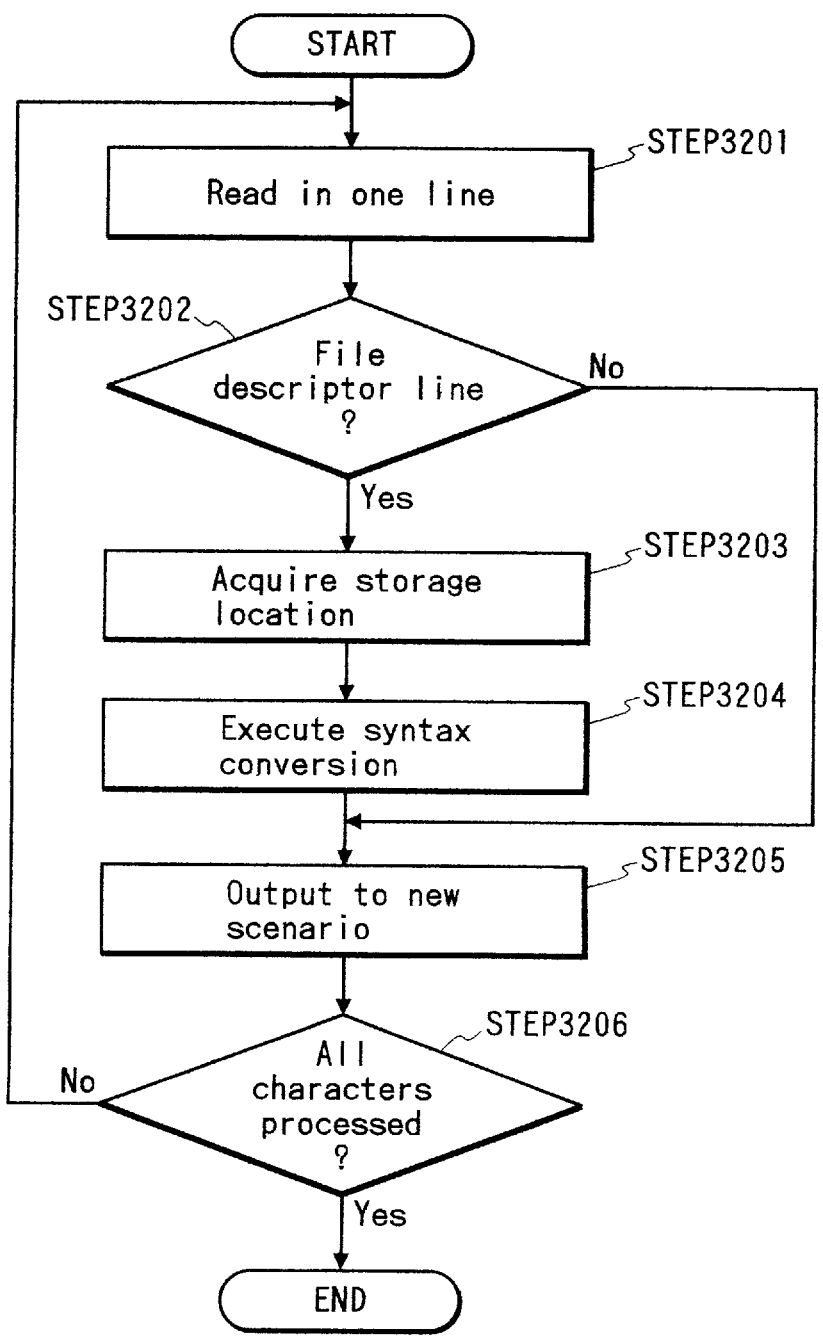

The scenario conversion processing which is executed for the case of hypermedia title acquisition processing is almost identical to that executed for the case of hypermedia title registration processing, described above. In the same way as for title registration processing, if no script conversion procedure is specified in the connection information that has been registered for the requesting client terminal, then the conversion procedure selection section 2202 will select the standard script conversion procedure, for executing only path name syntax conversion, and passes this to the script conversion section 2201. In that case, the contents of step 43 of FIG. 21 are as shown in in the flow diagram of FIG. 22A, for the case in which the requesting client terminal utilizes the single-file structure for the scenario file. As can be seen, the respective steps of the flow diagram of FIG. 22A are identical to the corresponding steps of FIG. 20A. The only difference between these is that the direction of path name syntax conversion is inverted, between the two, i.e. with the flow diagram of FIG. 22A, the resultant scenario contains subject matter data file storage location information which is in accordance with the storage location syntax used by the requesting client terminal. Hence, the requesting client terminal can use that scenario to access any of the stored subject matter data files of that hypermedia title, or (by running an appropriate application program) to execute playing of the scenario.

Figure 22B:
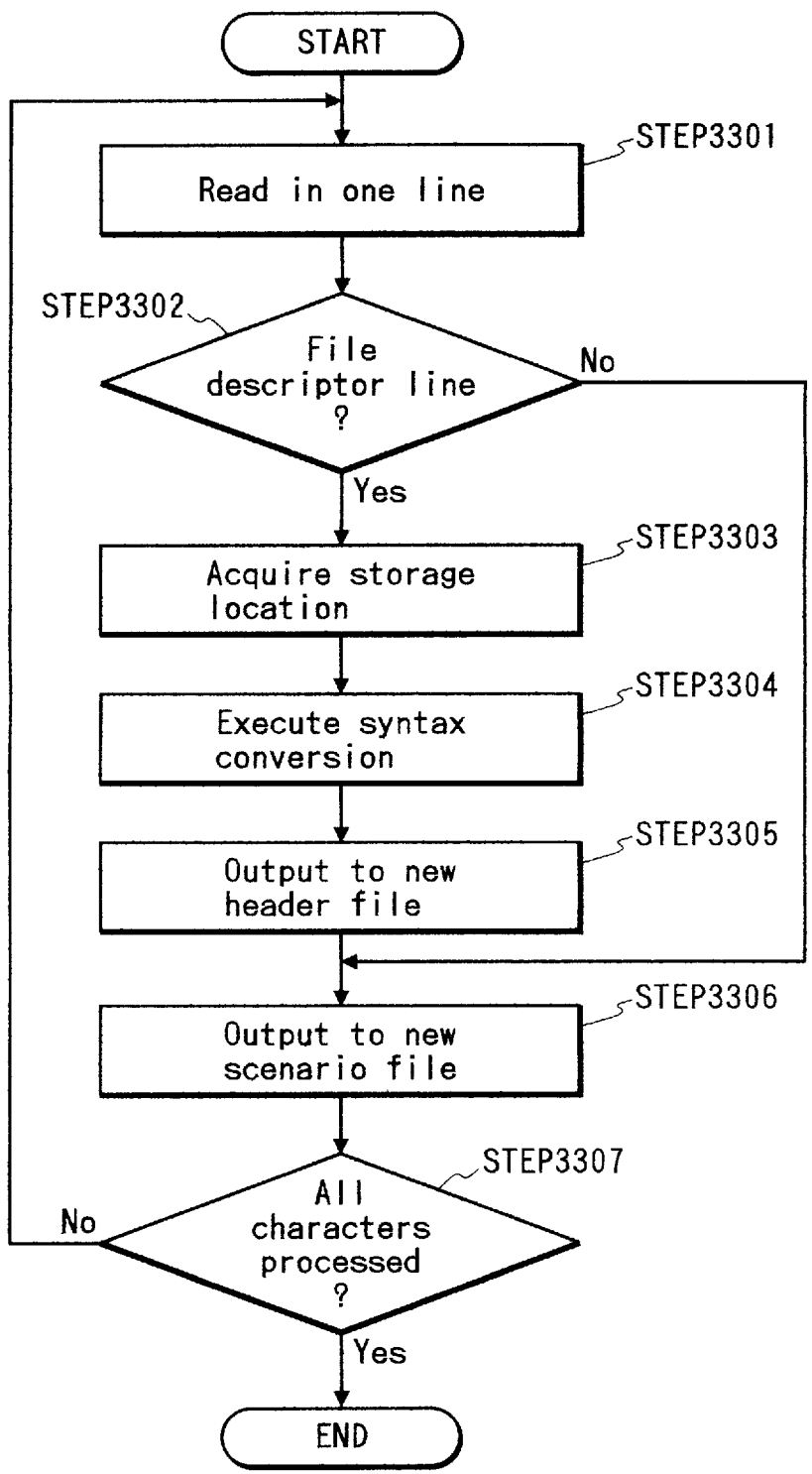
FIG. 22B is a corresponding flow diagram for the case in which a dual-file structure is utilized for the scenario file by the client terminal.

If the requesting client terminal utilizes scenario file which are of the two-file form described above, i.e. consisting of a header file and a scenario file proper, then the processing operations shown in the flow diagram of FIG. 22B are executed, as the contents of step 43 of the hypermedia title acquisition processing of FIG. 21. The steps of FIG. 22B are as follows:

Step 3301: a line of the scenario file (obtained from the file storage device 2301) is read in.

Step 3302: if the line is a subject matter descriptor line, then step 3303 is executed, otherwise step 3306 is executed.

Step 3303: the connection information for the client terminal concerned is obtained and examined, to find the equivalent storage location information (path name information) of that line, expressed with the storage location syntax employed within that client terminal.

Step 3304: the contents of that line are converted to the storage location information syntax form which has been determined in step 3303.

Step 3305: the converted line is entered into the new header file (i.e. which is being created by this processing).

Step 3306: if step 3305 has been executed, then extract from that line the title name only, and enter the title name into the new scenario file. If processing has jumped from step 3302 (i.e. the line which has been read in is not a subject matter data file descriptor line), then the line is entered, unchanged, into the new scenario file.

Step 3307: if the line which has been read in is the final line of the scenario file obtained from the file storage device 2301, then processing is terminated. Otherwise, step 3302 is again executed and the above sequence repeated.

Thus it can be understood that with this embodiment, the storage location information contained in a scenario sent from a client terminal (for registration of the corresponding hypermedia title) is converted by the information management server into a format which is in conformance with the information management server storage location syntax, and the resultant converted scenario file is stored by the information management server, whereas when a client terminal requests to acquire a hypermedia title which has already been registered, the information management server reads out the stored scenario file and converts the storage location information therein to be in in conformance with the information management server storage location syntax which is used in the requesting client terminal (i.e. the storage location syntax which would be utilized by a user of that client terminal when attempting to access a stored file), and sends the resultant scenario file to the requesting client terminal.

As a result, respective users of a plurality of client terminals of the client-server network which is connected to the information management server are enabled to access, in common, any hypermedia title which has been registered at the information management server, i.e. are enabled to play each hypermedia title or to acquire and operate on any desired subject matter data file of each hypermedia title.

Figure 24:
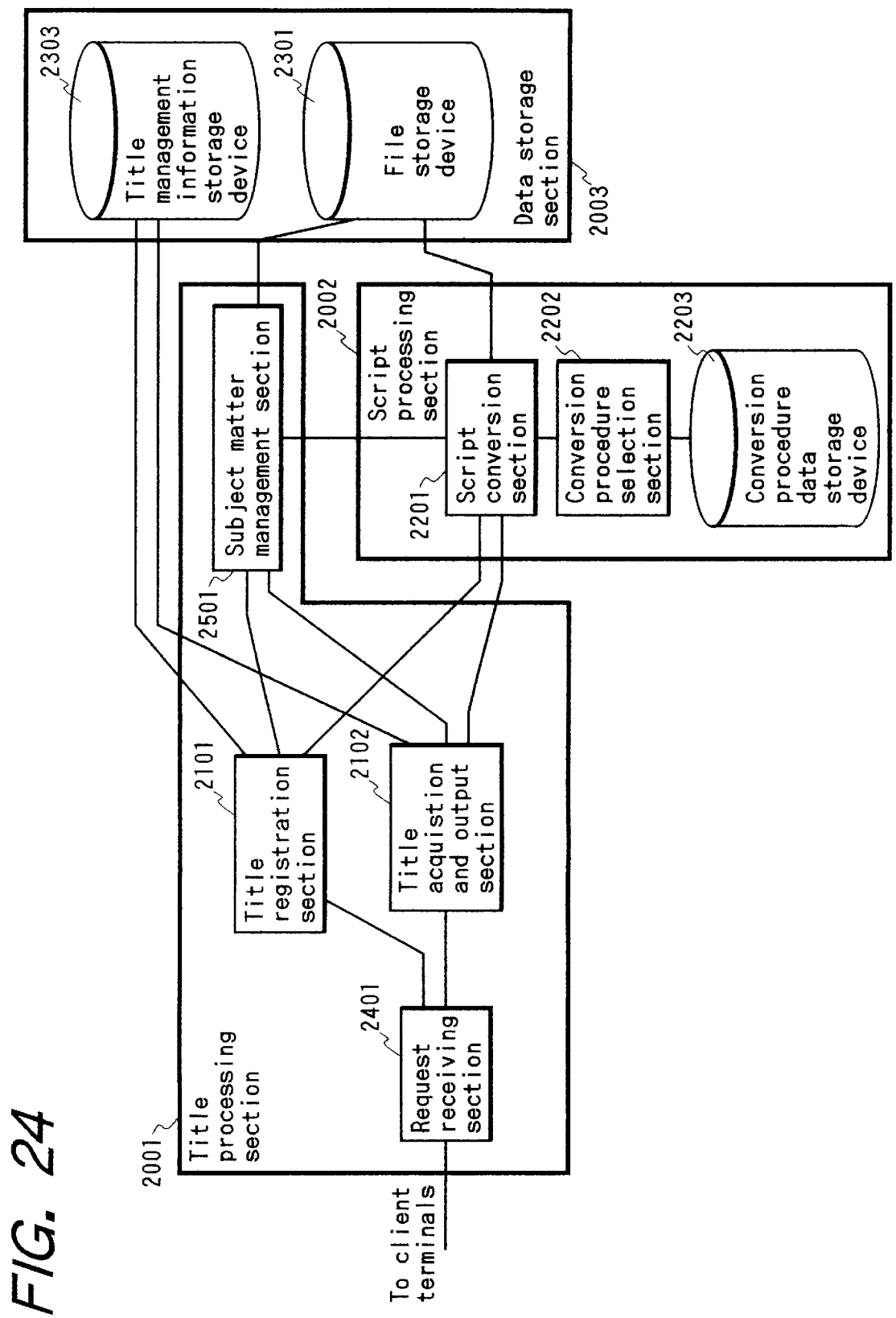
FIG. 24 is a general system block diagram of a fifth embodiment of an information management apparatus according to the present invention, which acquires and stores respective subject matter data files of a hypermedia title at the time of title registration.

A fifth embodiment of an information management apparatus according to the present invention will be described referring to the conceptual system block diagram of FIG. 24. This embodiment has various points of similarity to the fourth embodiment described above, but differs from that embodiment by further including additional functions, for use in storing and managing subject matter data of hypermedia titles. These additional functions are provided by a subject matter management section 2501 which forms part of the title processing section 2001 of this embodiment. As shown in FIG. 24, the subject matter management section 2501 is coupled to the title registration section 2101, title acquisition and output section 2102, and script conversion section 2201, and also to the file storage device 2301 of the data storage section 2003.

Figure 17:
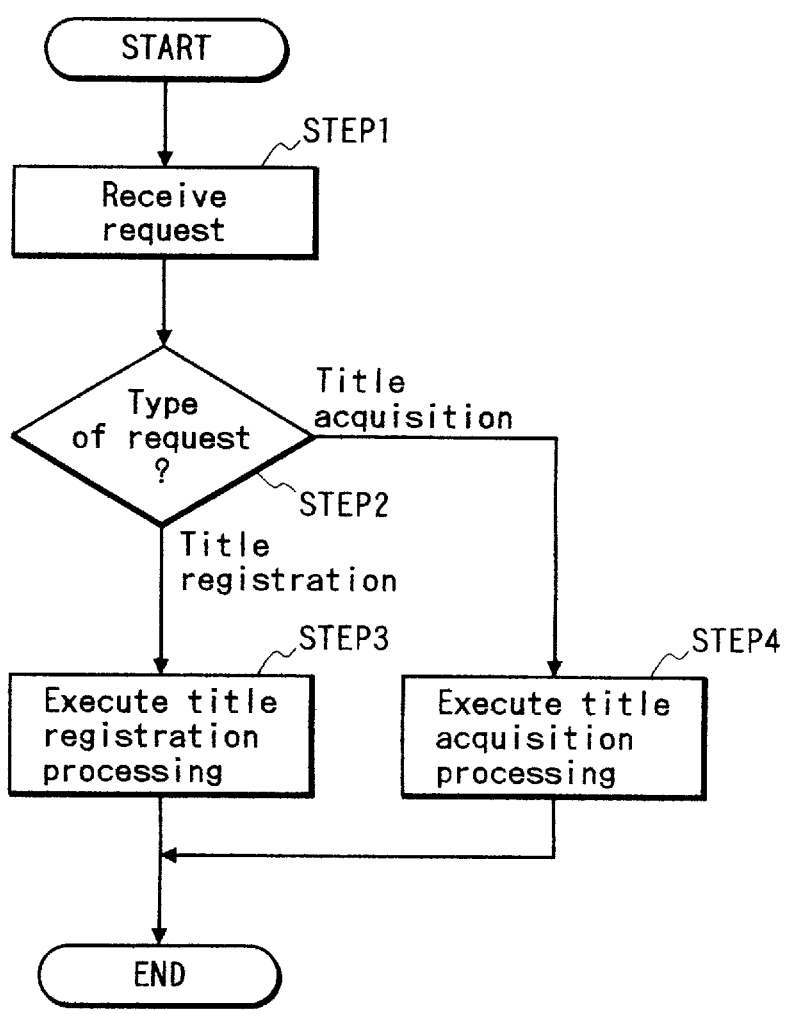
FIG. 17 is a flow diagram showing the basic operation processing of the fourth embodiment.
Figure 25:
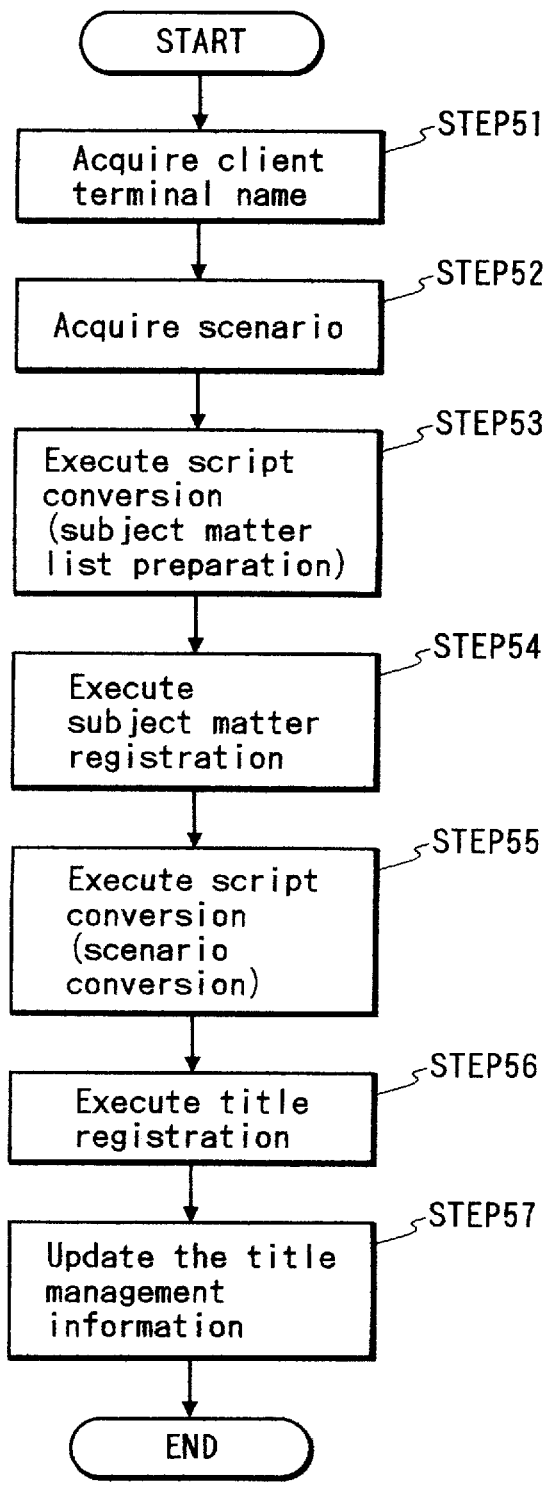
FIG. 25 is a flow diagram of the overall title registration processing executed with the fifth embodiment.

The basic operating flow of this embodiment is identical to that shown in FIG. 17, described above. However this embodiment differs with respect to the contents of step 3 of FIG. 17, i.e. title registration processing. FIG. 25 is a flow diagram of the hypermedia title registration processing operations executed with the fifth embodiment, which are as follows:

Step 51: the title registration section 2101 obtains the name of the client terminal which is requesting that a new hypermedia title be registered by the information management server.

Step 52: the scenario file of the hypermedia title which is to be registered is acquired.

Step 53: the script conversion section 2201 prepares the subject matter list, listing the subject matter data files (of the hypermedia title which is to be registered) that are to be registered by the information management server, based on the contents of the acquired scenario file.

Step 54: the subject matter management section 2501 stores the subject matter data files which are specified in the prepared subject matter list in the file storage device 2301.

Step 55: the script conversion section 2201 converts the acquired scenario file to a new scenario file, based on the contents of the acquired scenario file and the subject matter list.

Step 56: the new scenario is stored in the file storage device 2301.

Step 57: the title registration section 2101 updates the title management information which are held in the title management information storage device 2303, by adding an entry which expresses information relating to the newly registered hypermedia title.

With this embodiment, the subject matter list is a list of the subject matter data files which must be registered (i.e. stored in specific storage locations) by the information management server, for the purposes of hypermedia title management, when a new hypermedia title is registered. The subject matter list can consist of storage location information for each of the subject matter data files of the hypermedia title, i.e. indicating the respective storage locations for these files at the time when the client terminals sends the request for registering the new title, in conjunction with storage location information indicating the respective locations where these subject matter data files are to be stored (i.e. re-stored) by the information management server.

If the scenario data received from the requesting client terminal are in two-part data file form as described hereinabove referring to the example of FIG. 14B (i.e. header file and scenario file), then the script conversion section 2201 generates the subject matter list by using the contents of the header file in step 53.

An example of the contents of such a subject matter list is shown in FIG. 26. With that example, the requesting client terminal has sent a scenario file in which a video subject matter data file (i.e. for the base-axis video object of the hypermedia title which is to be registered) has the file name "travel_1.mpg", and is already stored in a data storage device which forms part of the file storage device 2301 of the information management server. However the requesting client terminal uses the designation "machine1" for that particular data storage device, whereas the information management server designates each of the data storage devices constituting the file storage device 2301 by the same name, i.e. "server". In such a case, to register such a subject matter data file, it is only necessary for the information management server to change the subject matter data file storage location syntax (if necessary) to be in conformance with its own syntax, i.e. it will not be necessary to transfer and store such a subject matter date file. However if a subject matter data file is found to be stored at some other computer system (server) of the network, then it is necessary for the information management server to acquire that subject matter data file and store it in the appropriate data storage device of the file storage device 2301.

Figure 27:
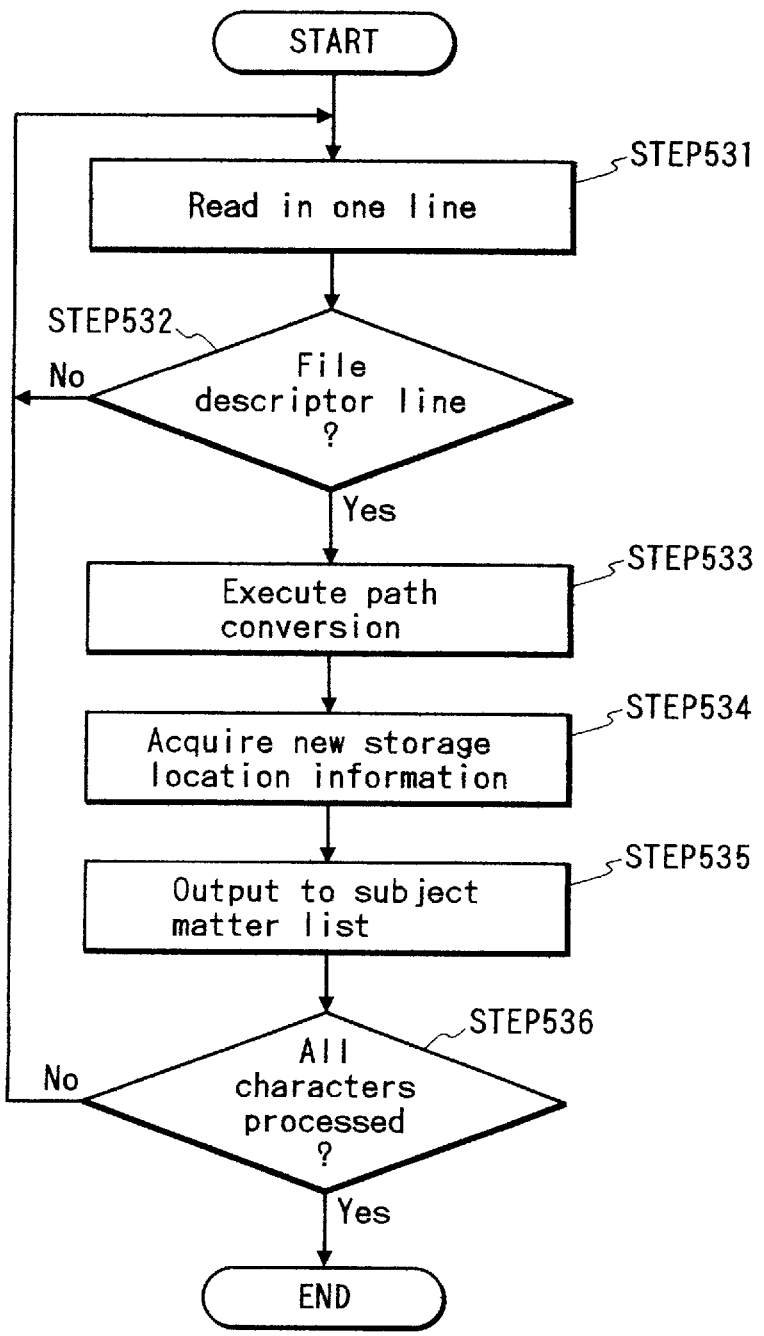
FIG. 27 is a flow diagram showing a script conversion procedure which is executed for preparing the subject matter list.

FIG. 27 is a flow diagram showing the contents of step 53 of the flow diagram of FIG. 25. The operation contents are as follows:

Step 531: a line of the scenario file is read in.

Step 532: a decision is made as to whether the line is a subject matter data file descriptor line, i.e. containing storage location information. If so, step 533 is executed, otherwise processing returns to step 531.

Step 533: if the storage location information indicates that the subject matter data file is already stored at information management server (i.e. in the file storage device 2301), then the connection information for the requesting client terminal is referred to, as described hereinabove for the preceding embodiment, and is used to convert the subject matter data storage location information (path name information) of that line into a path name in accordance with the syntax used by the information management server. If the storage location information of that line indicates that the subject matter data file is stored at some other computer system (e.g. server) of the network, then that storage location information is converted into storage location information which can be used by the information management server to acquire that subject matter data file from the other computer system, i.e. storage location information consisting of the name of the other computer system together with the path to that subject matter data file within the storage system of other computer system, expressed in the syntax used by the information management server, and the file name.

Step 534: a decision is made as to whether the type of subject matter data file which is specified in the line that has been read in (i.e. video data, still picture data, etc.), based on the file name extension. A storage location within the storage apparatus (i.e. the file storage device 2301) of the information management server is then selected, which is suitable for storing that subject matter data file. The file storage device 2301 can consist of a plurality of physical data storage devices, appropriate for storing respectively different types of monomedia data.

Step 535: the subject matter list is generated. This consists of, for each subject matter data file specified in the scenario sent from the requesting client terminal:

(a) the storage location for that file within a local storage apparatus of the information management server, expressed in the storage location syntax used by the information management server, or (if the file is stored at some other computer system of the network) storage location information which can be used by the information management server to acquire that subject matter data file, and (b) the storage location within the file storage device 2301 at which the subject matter data is to be re-stored.

Step 536: if the line which has been read in is the final line of the scenario file obtained from the requesting client terminal, then processing is terminated. Otherwise, step 531 is again executed and the above sequence repeated.

Figure 28A:
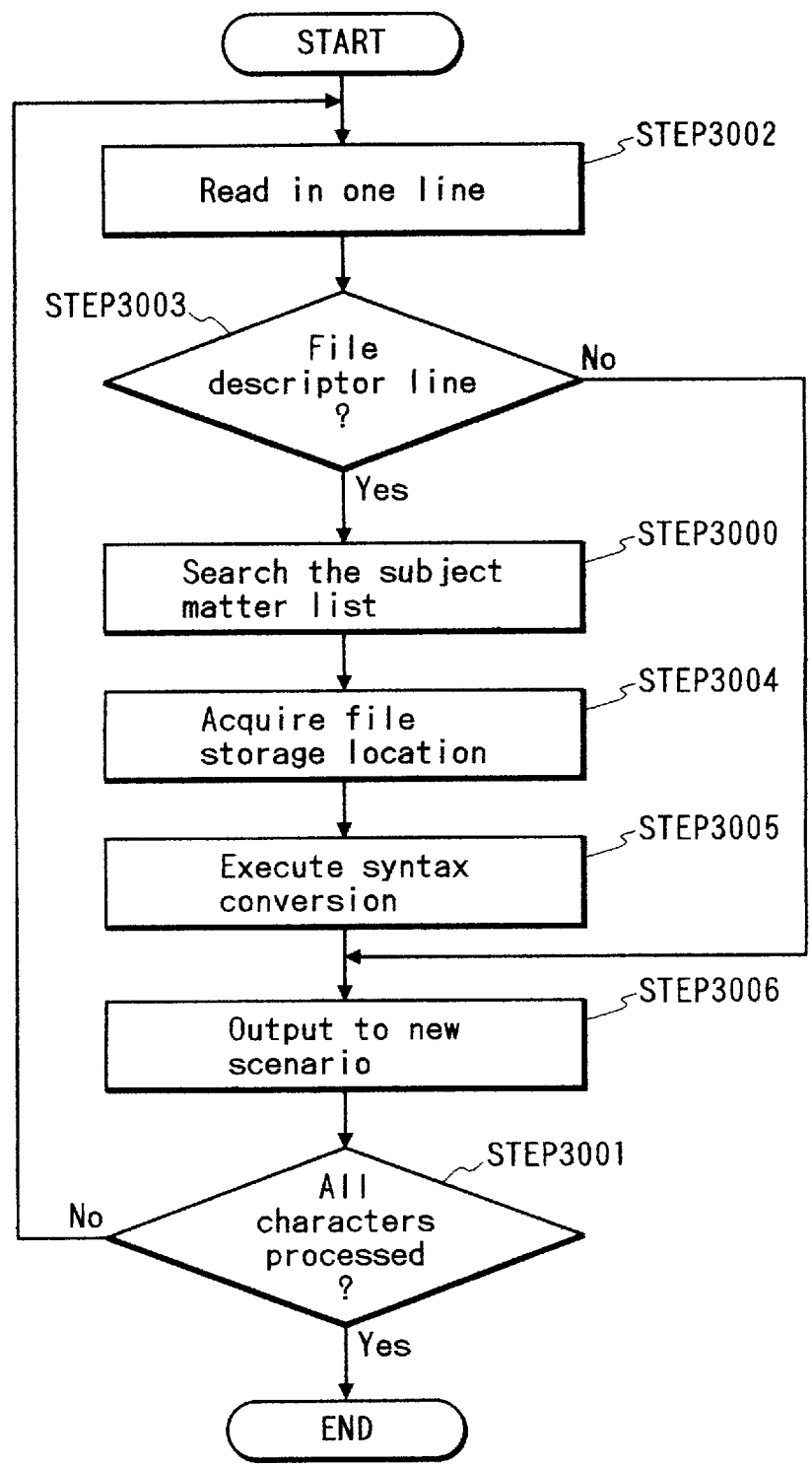
FIGS. 28A, 28B are respective flow diagrams of script conversion procedures executed during title registration processing, with the fifth embodiment, for the case of a single-file type of scenario file and the case of a dual-file type of scenario file, respectively.

FIG. 28A is a flow diagram showing the contents of step 55 of the flow diagram of FIG. 25. The contents of FIG. 28A are similar to those of the scenario conversion procedure shown in FIG. 20A. The main point of difference from the scenario conversion procedure shown of FIG. 28A is that a processing step 3000 is inserted between steps 3003, 3004, i.e. a step of referring to the aforementioned subject matter list. This is executed since with this embodiment, the process of hypermedia title registration results in each of the subject matter data files of a title being stored at locations which are specified in the corresponding subject matter list. It can thus be understood that steps 3004, 3005 and 3006 in FIG. 28A actually represent a process of obtaining from the subject matter list the storage location information which specifies where the respective subject matter data files are stored or have been re-stored in the file storage device 2301 (by execution of step 54 of FIG. 25), with that storage location information being expressed in the syntax used by the information management server, and inserting that storage location information into the original scenario file (sent from the requesting client terminal), to obtain the converted scenario file. The converted scenario file is then stored in the file storage device 2301.

Figure 28B:
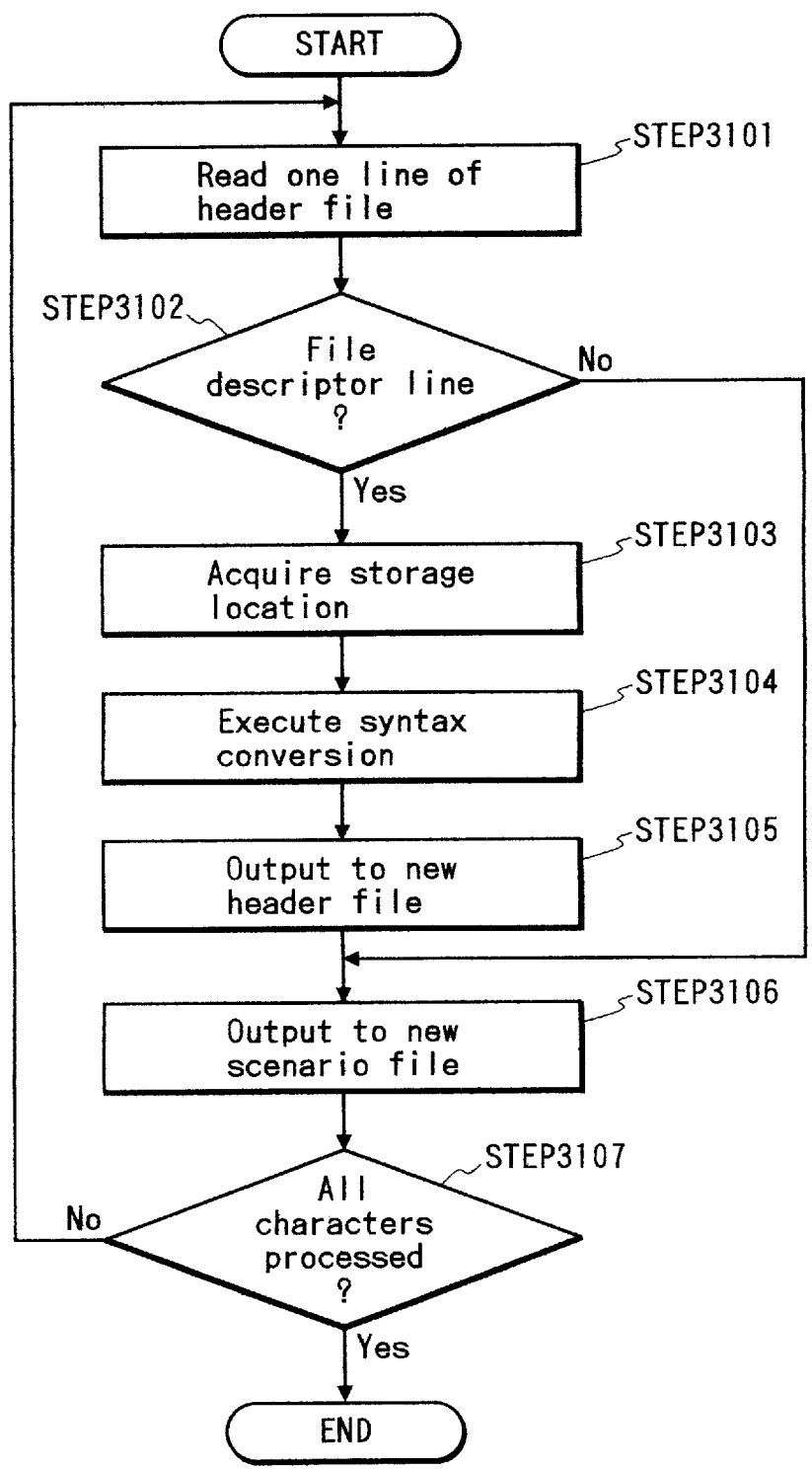

If the requesting client terminal in such a case is a terminal which utilizes the two-file format for scenario data i.e. header file and scenario file, as described above), then the process of converting the (converted) scenario file which has been stored in the file storage device 2301 back into a (header+scenario file) pair is executed in a similar manner to that described for the preceding embodiment, as shown in the flow diagram of FIG. 28B. As can be seen, this is identical to the flow diagram of FIG. 22B described above, since the same function is performed. However the storage location information which is contained in the resultant scenario file produced by the operations of FIG. 28B will specify only locations (paths) within the file storage device 2301.

As can be understood from the above, with this embodiment of the invention, respective sets of storage location (path information) for the subject matter data files of a hypermedia title which is to be registered, i.e. storage location information contained in a scenario sent from a requesting client terminal, are analyzed, to be converted to storage location information in a syntax form used by the information management server, as for the preceding embodiment. However with this embodiment, the respective subject matter data files of that title are then acquired and stored in a predetermined part of the file storage system of the information management server, i.e. in respective data storage devices which are suitable for respectively different types of data. If it is found that a subject matter data file specified in the scenario sent from the client terminal is not stored locally at the information management server, e.g. is stored at some other server of the network, then the storage location information for such a file is first converted into a form which can be used by the information management server (i.e. path conversion), and the information management server then acquires the file data via the network and stores the data in the same manner as for other subject matter data, i.e. in a local data storage device which is selected as being suitable for the type of subject matter data.

After a hypermedia title has thus been registered at the information management server, when a client terminal sends a request to acquire that hypermedia title, the information management server wall read out the scenario file for that hypermedia title from the file storage device 2301, then execute syntax conversion of the storage location information contained in that scenario file (using the connection information for the requesting client terminal, in the same way as described for the preceding embodiment), and send the resultant converted scenario file to the requesting client terminal. If the client terminal utilizes a basically different format for the scenario file, such as the two-file format employing a header file, then such a scenario file is generated and sent to the requesting client terminal, which can then use the storage location information of that scenario file to access the file storage device 2301 to obtain any of the subject matter data files of that hypermedia title, or to play the hypermedia title.

Figure 29:
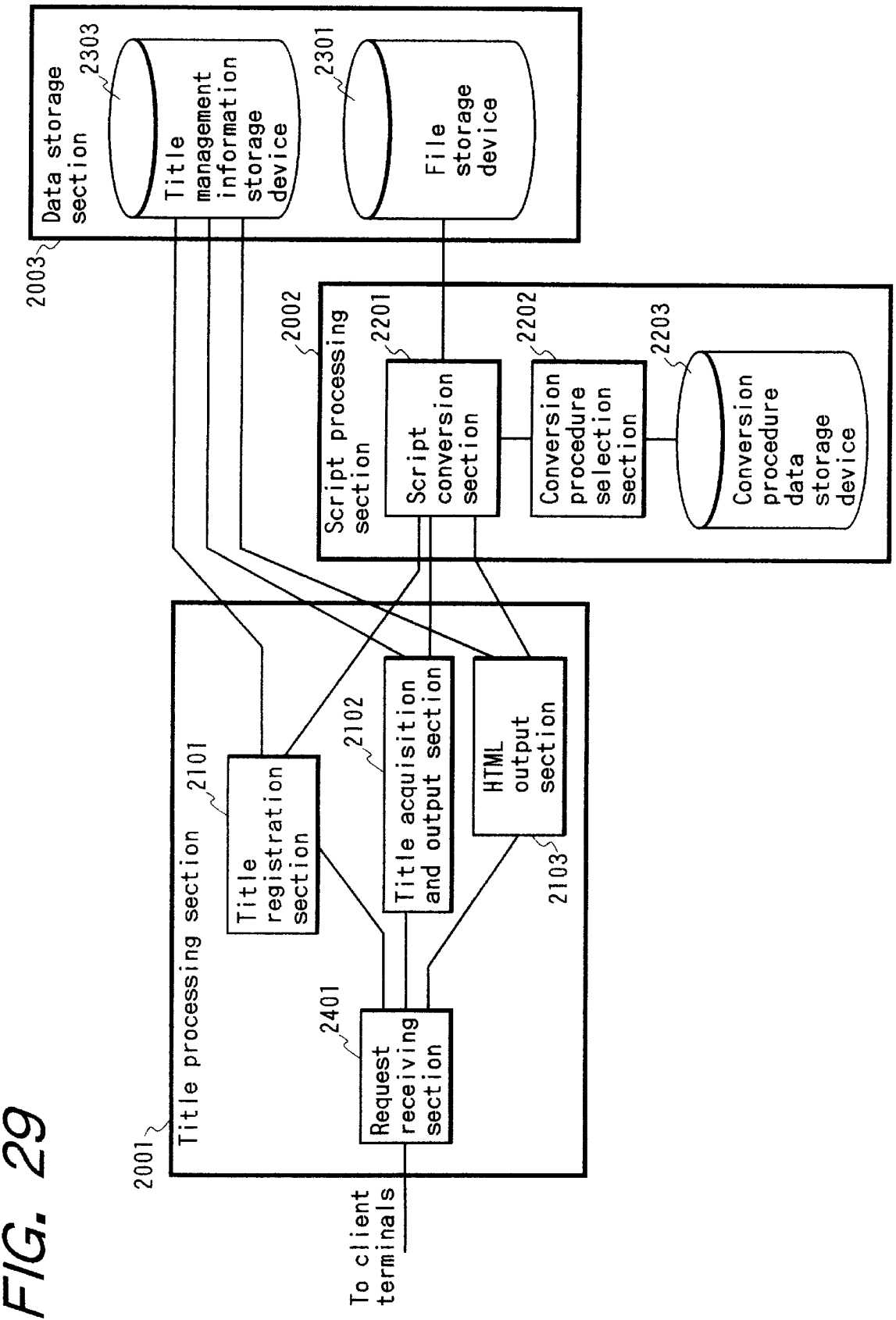
FIG. 29 is a general system block diagram of a sixth embodiment of an information management apparatus according to the present invention, which is provided with a capability for generating HTML files based on the contents of the title management information, to be supplied to a client terminal.

A sixth embodiment of an information management apparatus according to the present invention will be described, referring to the conceptual system block diagram of FIG. 29. This embodiment differs from the fourth embodiment described above only by further including a capability for generating HTML files corresponding to the title management information information, in response to a request from a client terminal, to enable a client terminal user to search for hypermedia titles by the well-known method of accessing successive linked HTML "notice board" pages (i.e. a graphical menu) until the page which lists a desired hypermedia title is displayed, enabling that title to be accessed by the user. The function of supplying these HTML files to a client terminal is performed by an HTML output section 2103 provided in the title processing section 2001, as shown in FIG. 29, which is coupled between the request receiving section 2401 and the script conversion section 2201 and title management information storage device 2303. The processing to actually generate the HTML files is performed by the script conversion section 2201, which is supplied with the necessary title management information by the HTML output section 2103, obtained from the title management information storage device 2303.

Figure 30:
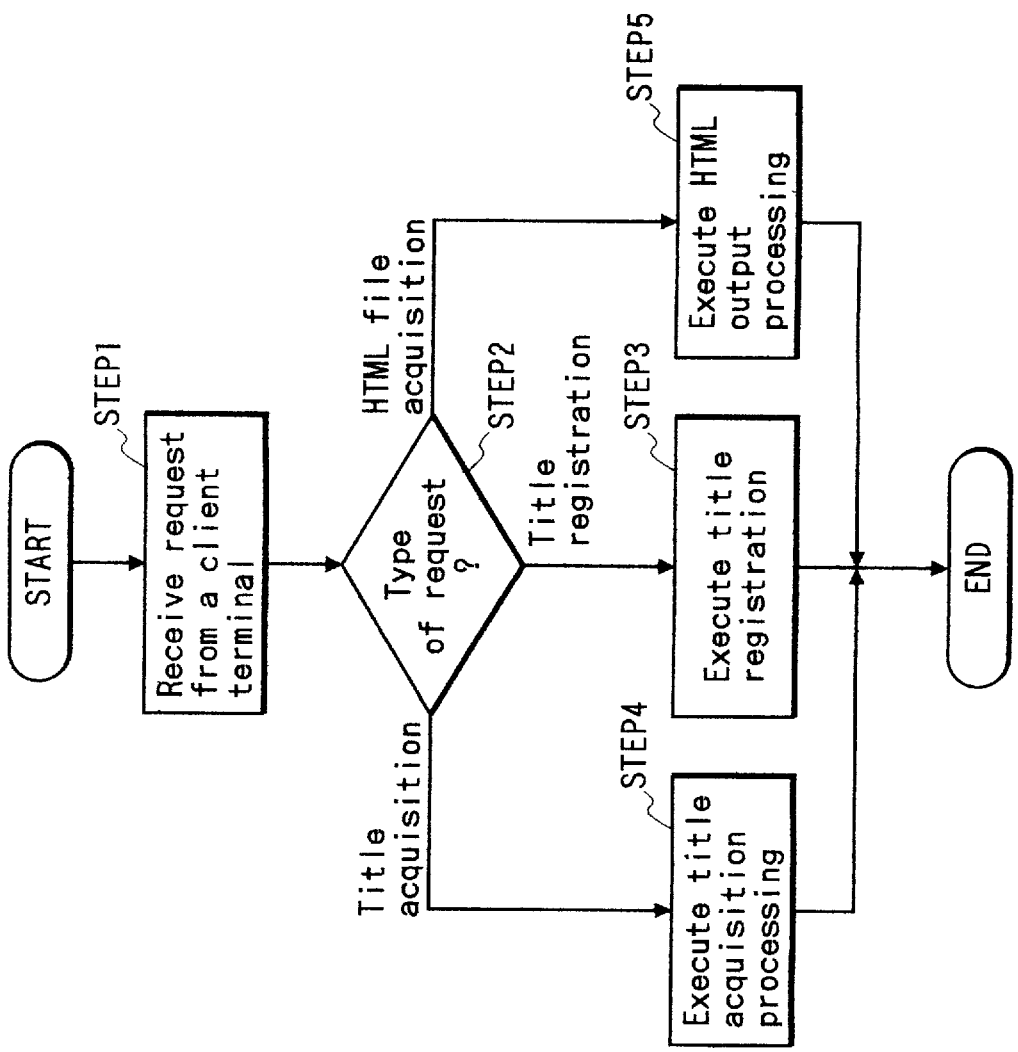
FIG. 30 is a flow diagram showing the overall operation of the sixth embodiment.

FIG. 30 is a flow diagram showing the overall operating flow of this embodiment. The operations shown in FIG. 30 are as follows Step 1: the request receiving section 2401 receives a request from a client terminal.

Step 2: the request receiving section 2401 judges the type of request.

Step 3: if the request is for registration of a new hypermedia title, then the title registration section 2101 executes the necessary processing.

Step 4: if the request is for acquisition of a specified hypermedia title, then the title acquisition and output section 2102 executes the necessary processing.

Step 5: if the request is for HTML files, the script conversion section 2201 and HTML output section 2103 executes HTML conversion and file output processing.

Since steps 3, 4 are identical to the corresponding steps of FIG. 17 for the fourth embodiment, described hereinabove, further details will be omitted.

Figure 31:
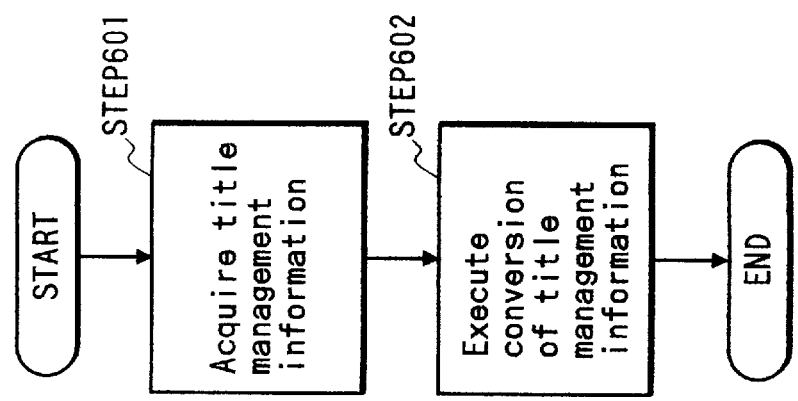
FIG. 31 is a flow diagram showing the basic operations of executing HTML file output processing, with the sixth embodiment.

FIG. 31 is a flow diagram showing the contents of the HTML output processing step 5 of FIG. 30. This consists of the following operations:

Step 601: the HTML output section 2103 obtains the title management information from the title management information storage device 2303.

Step 602: the script conversion section 2201 converts the title management information to HTML files.

Figure 32:
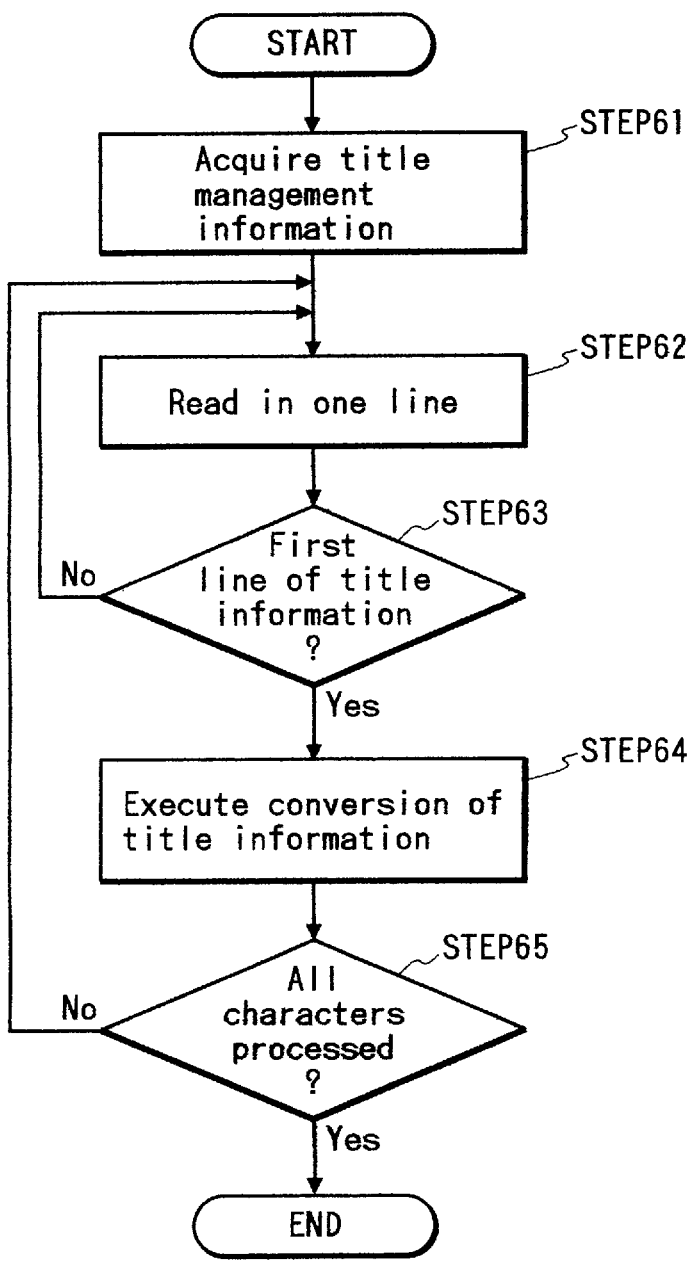
FIG. 32 is a flow diagram of a procedure executed to select successive title management information entries corresponding to respective hypermedia titles, for use in generating HTML files.

FIG. 32 is a flow diagram showing the contents of the title management information conversion processing step 602 of FIG. 31. This has the following contents:

Step 61: the script conversion section 2201 acquires the title management information from the HTML output section 2103.

Step 62: one line of the title management information is read in.

Step 63: if the line which is read in is the first line of a title management information entry for a hypermedia title, then step 64 is executed, otherwise step 65 is executed.

Step 64: the data of that title management information entry are processed by the script conversion section 2201, to generate corresponding HTML files.

Step 65: if all of the title management information have been processed, operation is terminated otherwise processing returns to step 62.

Figure 33:
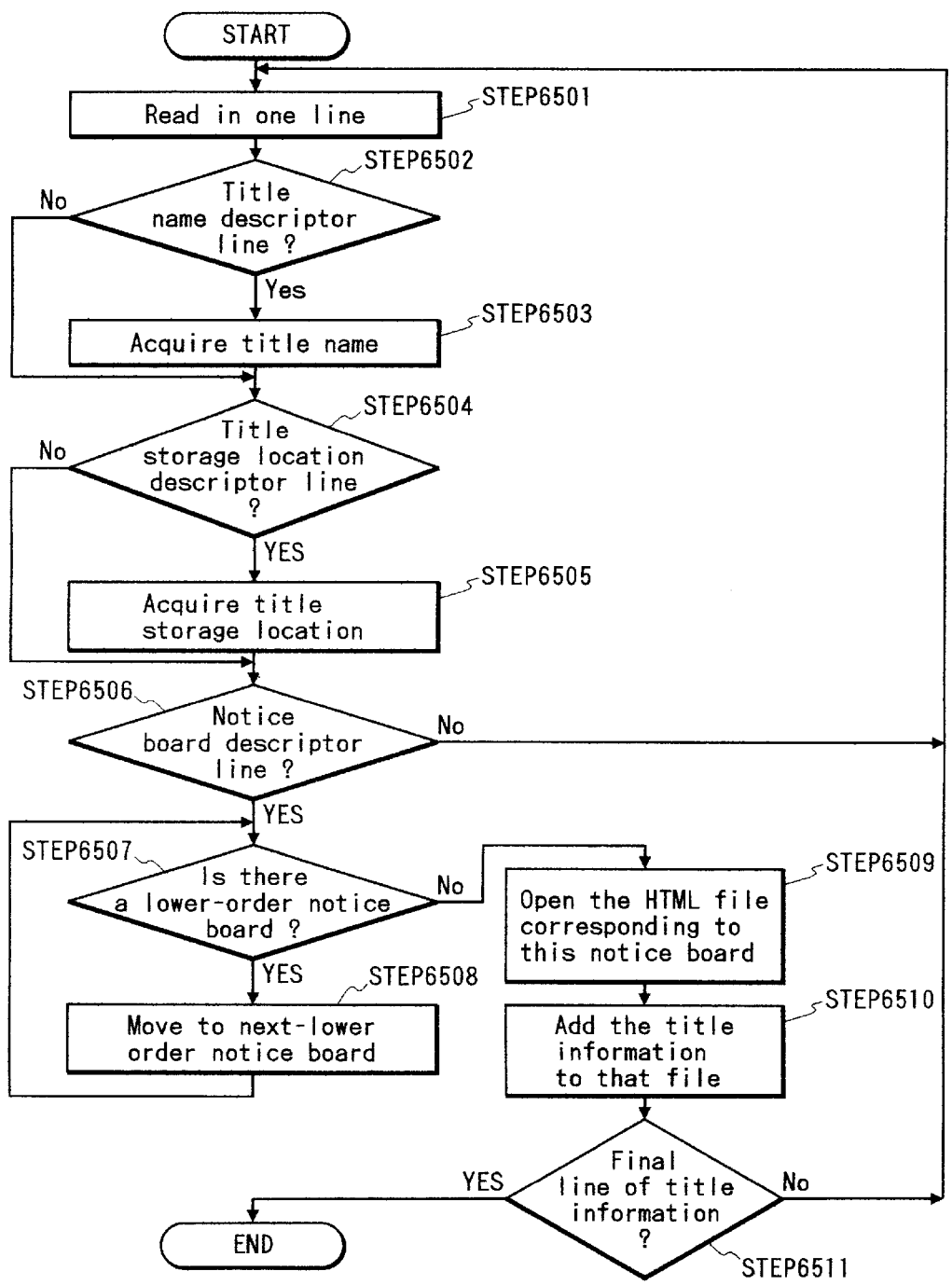
FIG. 33 is a flow diagram showing the processing executed to create or modify HTML files, based on the title management information for a hypermedia title.

FIG. 33 is a flow diagram showing the contents of the title management information conversion processing step 64 of FIG. 32. This consists of the following operations:

Step 6501: one line of the title management information is read in.

Step 6502: a decision is made as to whether the line which has been read in contains a title name. If so, step 6503 is executed, otherwise step 6504.

Step 6503: the title name is obtained from that line.

Step 6504: a decision is made as to whether the line which has been read in contains title storage location information. If so, step 6505 is executed, otherwise step 6506.

Step 6505: the title storage location information is obtained from that line.

Step 6506: a decision is made as to whether the line which has been read in contains a hierarchy of one or more notice board names. If so, step 6507 is executed, otherwise operation returns to step 6501.

Step 6507: in the first execution of this step, the highest-order notice board name is examined, and a decision is made as to whether there already exists an HTML file corresponding to that notice board. If there is not yet such a file, a new HTML file is created. A decision is then made as to whether there is at least one lower-order notice board named in the hierarchy. It so, step 6508 is executed, otherwise step 6509.

Step 6508: a decision is made as to whether there is already an HTML file corresponding to the next-lower order notice board, and if not, such a file is created. For example, if the notice board hierarchy is [for sale[tickets[ballet]] in the line which has been read in in step 6501, then after the first execution of step 6507, the notice board "tickets" would be found, as the next-lower order notice board. In that case, if necessary, a new HTML file "tickets.html" would be created in step 6508. The system further checks to find if there is an HTML link between that file and the HTML file corresponding to the next-higher order notice board (e.g. in the above example, between the file "tickets.html" and the file "forsale.html" which had been Found to exist or had beer created in the preceding execution of step 6507). If there is not, then such a link is added.

Operation then returns to step 6507, to find if there is a notice board named in that line which is of lower order than the next-lower order notice board which was examined in the preceding execution of step 6508. If so, step 6508 is again executed, otherwise step 6509. These successive executions of steps 6507, 6508 are repeated until the lowest-order notice board name of the hierarchy is reached, whereupon step 6509 is executed.

Step 6509: the HTML file corresponding to the lowest-order notice board named in that line is opened.

Step 6510: successive lines of the title information of that title management information entry are entered into that HTML file.

Step 6511: a decision is made as to whether the final line of the title information has been processed. If so, operation is terminated, otherwise operation returns to step 6501.

Figure 34:
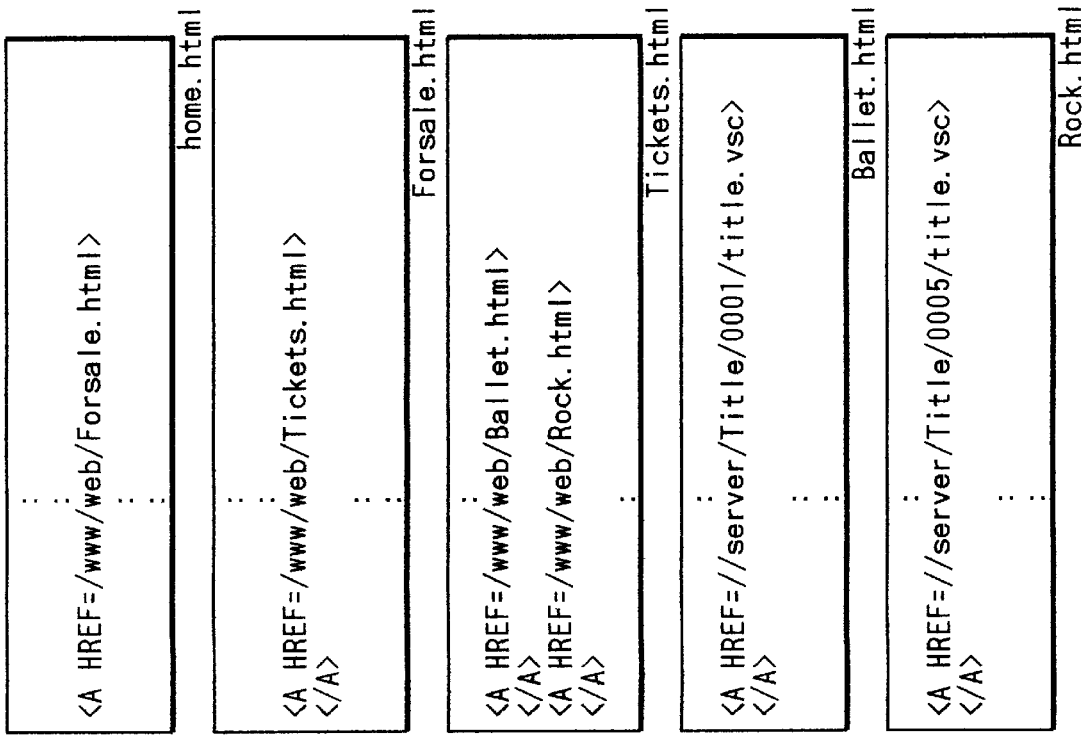
FIG. 34 is a diagram illustrating a specific example of generating a set of linked HTML files based upon the contents of title management information for respective hypermedia titles, with the sixth embodiment.

FIG. 34 shows an example illustrating how title management information entries (for stored hypermedia titles numbered 0001 and 0005 respectively) are used to generate HTML files during the process described above. It can be understood that as a result of the processing, for example, the storage location information for the title having title number 0001 is entered into the "Ballet.html" HTML file, which is linked from the "Tickets.html" file, which in turn is linked from the "Forsale.html" file.

Figure 35:
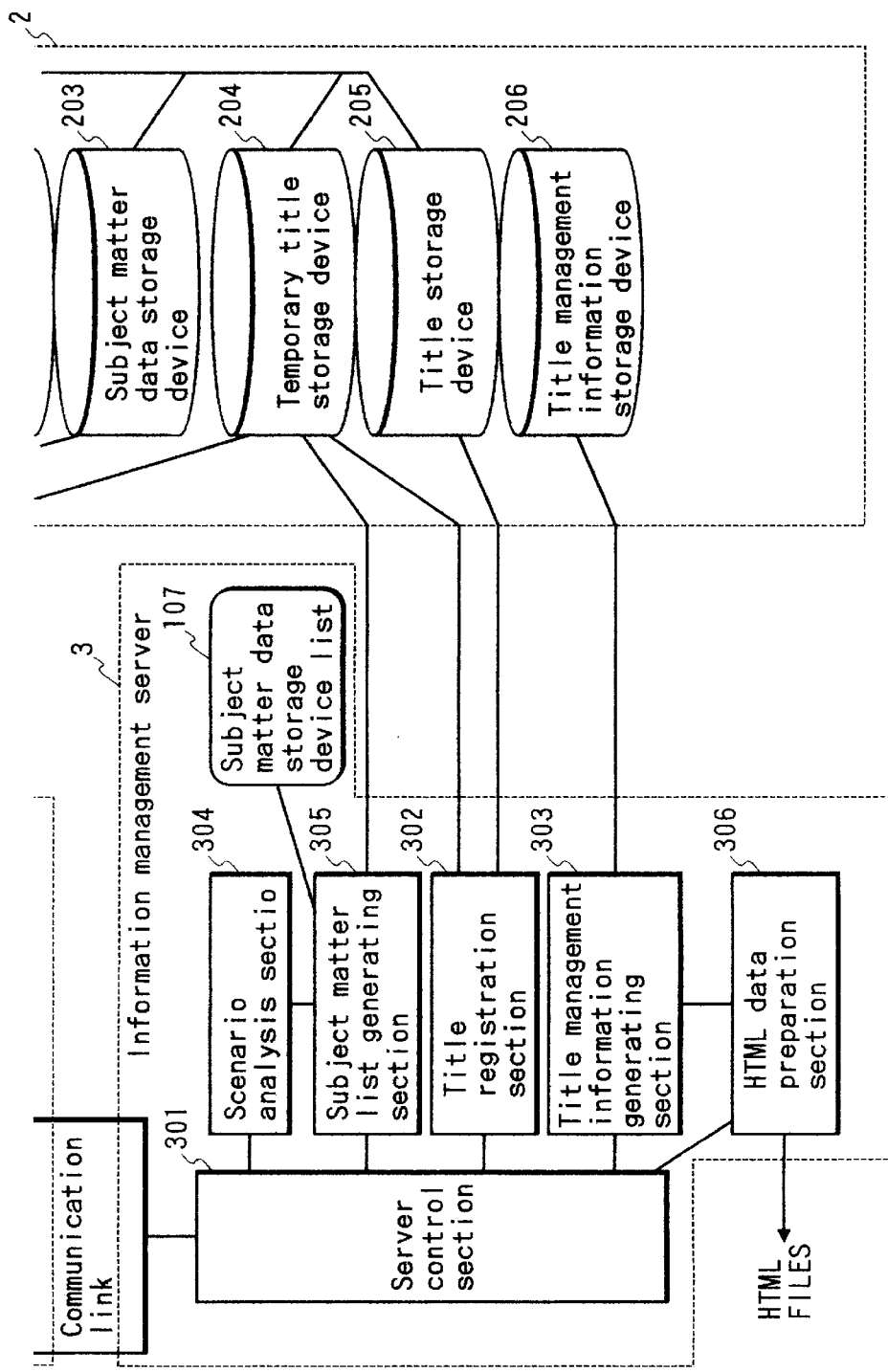
FIG. 35 is a partial system block diagram of a seventh embodiment of the invention, which is a modification of the first embodiment to provide a capability for generating and supplying HTML files, based on the title management information.

It will be apparent that It would be equally possible to provide the fifth embodiment described above with the HTML output capability described above. Furthermore, it would also be possible to add such a capability to the first embodiment of the invention. This is illustrated in the partial conceptual system block diagram of FIG. 35, showing an HTML preparation section 306, which executes the functions which are executed by the HTML output section 2103 and script conversion section 2201 of the sixth embodiment described above to convert the title management information to HTML files and provide these to a client terminal. In this case, the title management information are provided from the title management information storage device 206 by the title management information generating section 303 to the HTML data preparation section 306, which generates a corresponding set of linked HTML files by processing such as that described above, and outputs these files to the requesting client terminal. Since the HTML conversion processing can be similar to that described for the sixth embodiment, further description will be omitted.

What is claimed is:

1. An information management apparatus comprising an information management server (1006) and a plurality of client terminals (1001–1004) respectively connected for data interchange with said information management server, said information management server comprising:

data storage means (2003) including
file storage means (2301) for storing data files including respective scenario files for a plurality of multimedia titles, and
title management information storage means (2303) for storing title management information in the form of respective title management information entries for each of said multimedia titles, each of said title management information entries containing at least information which identifies a corresponding multimedia title;

script processing means (2002) for executing script conversion of data prior to storage in said file storage means and script conversion of data which are read out of said file storage means;

title processing means (2001) including title registration means (2101) for executing registration processing of a multimedia title in response to a request from one of said client terminals, in conjunction with a scenario file for said multimedia title, said scenario file including respective names and storage location information for subject matter data files constituting said multimedia title, said registration processing including operations for supplying said scenario file to said script processing means, to be subjected to script conversion from a form which is compatible with said requesting client terminal, and for storing a resultant scenario file in said file storage means, and operations for generating and storing in said title management information storage means a title management information entry relating to said multimedia title, and title acquisition and output means (2102) responsive to a request from one of said client terminals to acquire one of said multimedia titles for obtaining a scenario file for said multimedia title from said file storage means, supplying said scenario file to said script processing means, to be subjected to script conversion into a form which is compatible with said requesting client terminal, and supplying a resultant scenario file to said requesting client terminal;

said script processing means (2002) comprising conversion procedure data storage means (2203) having stored therein data expressing a plurality of respectively different script conversion procedures, conversion procedure selection means (2202) controllable for selecting a specified one of said script conversion procedures stored in said conversion procedure data storage means, and script conversion means (2201) for determining an appropriate one of said script conversion procedures in accordance with an identity of a client terminal which is requesting execution of title registration processing or title acquisition processing, for controlling said conversion procedure selection means to acquire said appropriate script conversion procedure from said conversion procedure data storage means, and for executing script conversion by utilizing said script conversion procedure.

2. An information management apparatus according to claim 1, wherein said script conversion procedures comprise procedures for conversion of syntax of said storage location information of a scenario file from a form which is compatible with a client terminal to a form which is compatible with said information management server, and procedures for conversion of syntax of said storage location information of a scenario file from a form which is compatible with said information management server to a form which is compatible with a client terminal.

3. An information management apparatus according to claim 1, wherein said script conversion procedures comprise at least one script conversion procedure for conversion of syntax of said storage location information of a scenario file from a form which is compatible with a client terminal to a form which is compatible with said information management server and conversion of said scenario file from a structure which is compatible with said client terminal to a structure which is compatible with said information management server, and at least one script conversion procedure for conversion of syntax of said storage location information of a scenario file from said form which is compatible with said information management server to said form which is compatible with said client terminal and for conversion of said scenario file from said structure which is compatible with said information management server to said structure which is compatible with said client terminal.

4. An information management apparatus comprising an information management server and a plurality of client terminals respectively connected for data interchange with said information management server, said information management server comprising:

data storage means (2003) including file storage means (2301) for storing a plurality of sets of data tiles respectively expressing a plurality of multimedia titles, each of sets formed of a scenario file and a plurality of subject matter data files, and title management information storage means (2303) for storing title management information in the form of respective title management information entries for each of said multimedia titles, each of said title management information entries containing at least information which identifies a corresponding multimedia title;

script processing means (2002) for executing script conversion of data prior to storage in said file storage means and script conversion of data which are read out of said file storage means;

title processing means (2001) including title registration means (2101) for executing registration processing of a multimedia title in response to a request from one of said client terminals, received in conjunction with a scenario file for said multimedia title, and for and storing title management information relating to said multimedia title in said title management information storage means, said scenario file including respective names and storage location information for subject matter data files constituting said multimedia title, subject matter management means (2501) for receiving from said title registration means said storage location information contained in said scenario file received from said requesting client terminal, for supplying said storage location information to said script processing means for conversion of said storage location information to corresponding converted storage location information which is in a form compatible with said information management server, for then using said converted storage location information to acquire each of said subject matter data files of said multimedia title for which registration is requested, and for storing said subject matter data files in said file storage means at specific locations, for inserting into said received scenario file storage location information expressing said specific locations, to thereby obtain a converted scenario file, and storing said converted scenario file in said file storage means, and title acquisition and output means (2102) responsive to a request from one of said client terminals to acquire one of said multimedia titles for obtaining a scenario file corresponding to said multimedia title from said file storage means, supplying said scenario file to said script processing means, to be subjected to script conversion for converting said storage location information of the scenario file into a form which is compatible with said requesting client terminal, and supplying a resultant scenario file to said requesting client terminal;

said script processing means (2002) comprising conversion procedure data storage means (2203) having stored therein data expressing a plurality of respectively different script conversion procedures, conversion procedure selection means (2201) controllable for selecting a specified one of said script conversion procedures stored in said conversion procedure data storage means, and script conversion means (2201) for determining an appropriate one of said script conversion procedures in accordance with an identity of a client terminal which is requesting execution of title registration processing or title acquisition processing, for controlling said conversion procedure selection means to acquire said appropriate script conversion procedure from said conversion procedure data storage means, and for executing script conversion by utilizing said script conversion procedure.

5. An information management apparatus according to claim 1 wherein at least a part of said title management information entries for said multimedia titles contain keyword information representing a plurality of groups of sequentially linked sets of data items arranged in a hierarchy of sets,. for use in search processing, and wherein said information management server further comprises HTML (Hypertext Markup Language) data output means (2103), responsive to a request from one of said client terminals for HTML data for reading out said title management information from said title management information storage means, converting said keyword Information of said title management information into a corresponding set of linked HTML files, and supplying said HTML files to said requesting client terminal.

6. An information management apparatus comprising an information management server (3), at least one client terminal (1), and common data storage means (2), connected for mutual data communication, said common data storage means (2) comprising subject matter data storage means (201, 202, 203), temporary title data storage means (204) and title data storage means (205), said subject matter data storage means comprising a plurality of subject matter data storage means which are dedicated to storage of respectively different types of monomedia data, said client terminal comprising data input means (102) operable by a user for inputting data to be used in creating a multimedia title, said input data comprising a plurality of respectively different types of monomedia data, subject matter preparation means (103) operable by said user for arbitrarily modifying said input data to form respective sets of subject matter data for said multimedia title, said sets comprising a plurality of sets of said respectively different types of monomedia data, and for storing said sets as respective subject matter data files in respectively corresponding ones of said plurality of subject matter data storage means, authoring means (104) operable by said user for arbitrarily selecting respective ones of said stored subject matter data files and for generating scenario data which specify a succession of events constituting said multimedia title and relate said events to specific ones of said selected subject matter data files, and for storing said scenario data as a scenario file in said temporary data storage means, scenario analysis means (105) for obtaining said scenario file from said temporary title data storage means and analyzing said scenario file to obtain respective file names of said selected subject matter data files, memory means (107) having stored therein a predetermined subject matter data storage device list, said list specifying respective storage device information for said selected subject matter data files with respect to said subject matter data data storage means, said storage device information being expressed in a form which is compatible with a mode of expressing storage location information employed by said information management server, subject matter list generating means (106) for operating on said subject matter data storage device list and said file names or said selected subject matter data files to generate a subject matter list, said subject matter list expressing respective storage location information for each of said selected subject matter data files with respect to said subject matter data storage means, and for storing said subject matter list as a file in said temporary title data storage means, client terminal control means (101) for overall control of said input means, subject matter preparation means, authoring means, scenario analysis means and subject matter list generating means, and responsive to said storing of said subject matter list for sending data expressing a title registration request to said information management server, said title registration request including information identifying said subject matter list file;

said information management server comprising title registration means (302) for reading out said scenario file from said temporary title data storage means, reading out said subject matter list from said temporary title data storage means and utilizing storage location information of said subject matter list to read out said selected subject matter data files for said subject matter data storage means, and storing said scenario file and selected subject matter data files in said title data storage means, and server control means (301) for receiving said title registration request and controlling said title registration means in accordance with contents of said title registration request.

7. An information management apparatus comprising an information management server (3), at least one client terminal (1), and common data storage means (2) connected for mutual data communication, said common data storage means (2) comprising subject matter data storage means (201, 202, 203), temporary title data storage means (204), and title data storage means (205), said subject matter data storage means comprising a plurality of subject matter data storage means which are dedicated to storage of respectively different types of monomedia data, said client terminal comprising data input means (102) operable by a user for inputting data to be used in creating a multimedia title, said input data comprising a plurality of respectively different types of monomedia data, subject matter preparation means (103) operable by said user for arbitrarily modifying said input data to form respective sets of subject matter data for said multimedia title, said sets comprising a plurality of sets of said respectively different types of monomedia data, and for storing said sets as respective subject matter data files in respectively corresponding ones of said plurality of subject matter data storage means, authoring means (104) operable by said user for arbitrarily selecting respective ones of said stored subject matter data files and for generating scenario data which specify a succession of events constituting said multimedia title and relate said events to specific ones of said selected subject matter data files, and for storing said scenario data as a scenario file in said temporary title data storage means, client terminal control means (101) for overall control of said input means, subject matter preparation means, authoring means, scenario analysis means and subject matter list generating means, and responsive to said storing of said subject matter list for sending data expressing a title registration request to said information management server, said title registration request including information identifying said subject matter list file;

said information management server comprising scenario analysis means (304) for obtaining said scenario file from said temporary title data storage means and analyzing said scenario file to obtain respective file names of said selected subject matter data files, memory means (107) having stored therein a predetermined subject matter data storage device list, said list specifying respective storage device information for said selected subject matter data files with respect to said subject matter data data storage means, said storage device information being expressed in a form which is compatible with a mode of expressing storage location information employed by said information management server, subject matter list generating means (305) for operating on said subject matter date storage device list and said file names of said selected subject matter data files to generate a subject matter list, said subject matter list expressing respective storage location information for each of said selected subject matter data files with respect to said subject matter data storage means, and for storing said subject matter list as a file in said temporary title data storage means, title registration means (302) for reading out said scenario file from said temporary title data storage means, reading out said subject matter list from said temporary title data storage means and utilizing storage location information of said subject matter list to read out said selected subject ratter data files from said subject matter data storage means, and storing said scenario file and selected subject matter data files in said title data storage means, and server control means (301) for receiving said title registration request and controlling said title registration means in accordance with contents of said title registration request.

8. An information management apparatus according to claim 6, wherein said common data storage means further comprises title management information storage means (206) and said information management server further comprises title management information generating means (303) controlled by said server control means for generating title management information information and storing said title management information information as a file in said title management information storage means, said title management information generating means functioning, at a time when said selected subject matter data files and scenario file of a new multimedia title are stored in said title data storage means, to update said title management information file by adding thereto a title management information entry relating to said new multimedia title;

each said title management information entry specifying at least storage location information for said multimedia title with respect to said title data storage means, and information for identifying said multimedia title.

9. An information management apparatus according to claim 8, wherein at least a part of said title management information entries for said multimedia titles contain keyword information representing a plurality of groups of sequentially linked sets of data items arranged in a hierarchy of sets, for use in search processing, and wherein said information management server further comprises HTML data preparation means (306) controlled by said server control means in response to a request from a client terminal for HTML data, for converting said keyword information of said title management information information entry to corresponding HTML (Hypertext Markup Language) files, and supplying said HTML files to said requesting client terminal.

10. An information management apparatus according to claim 8, wherein said information management server further comprises external database interface means (307) coupled to transfer data between said title management information generating means and an external relational database, and wherein said title management information generating means further comprises means controlled by said title registration means and said server control means for detecting any changes made in said title management information file which is stored in said title management information storage means, for generating data indicative of said changes in SQL (Structured Query Language) form, and supplying said data via said external database interface means to said external relational database, for use in updating portions of said external relational database which relate to said title management information.

* * * * *